United States Patent
Lewis et al.

(10) Patent No.: US 7,185,035 B1
(45) Date of Patent: Feb. 27, 2007

(54) ARITHMETIC STRUCTURES FOR PROGRAMMABLE LOGIC DEVICES

(75) Inventors: David Lewis, Toronto (CA); Bruce Pedersen, Sunnyvale, CA (US); Sinan Kaptanoglu, Belmont, CA (US)

(73) Assignee: Altera Corporation, San Jose, CA (US)

( * ) Notice: Subject to any disclaimer, the term of this patent is extended or adjusted under 35 U.S.C. 154(b) by 676 days.

(21) Appl. No.: 10/693,576

(22) Filed: Oct. 23, 2003

(51) Int. Cl.
    *G06F 7/38* (2006.01)
(52) U.S. Cl. .................................... 708/235
(58) Field of Classification Search ......... 708/230–236
    See application file for complete search history.

(56) References Cited

U.S. PATENT DOCUMENTS

| | | |
|---|---|---|
| 5,260,610 A | 11/1993 | Pedersen et al. |
| 5,260,611 A | 11/1993 | Cliff et al. |
| 5,274,581 A | 12/1993 | Cliff et al. |
| 5,295,090 A | 3/1994 | Hsieh et al. |
| 5,349,250 A | 9/1994 | New |
| 5,359,242 A | 10/1994 | Veenstra |
| 5,359,468 A | 10/1994 | Rhodes et al. |
| 5,365,125 A | 11/1994 | Goetting et al. |
| 5,436,575 A | 7/1995 | Pedersen et al. |
| 5,481,206 A | 1/1996 | New et al. |
| 5,481,486 A | 1/1996 | Cliff et al. |
| 5,483,478 A | 1/1996 | Chiang |
| 5,485,103 A | 1/1996 | Pedersen et al. |
| 5,488,316 A | 1/1996 | Freeman et al. |
| 5,500,608 A | 3/1996 | Goetting et al. |
| 5,523,963 A | 6/1996 | Hsieh et al. |
| 5,546,018 A | 8/1996 | New et al. |
| 5,629,886 A | 5/1997 | New |
| 5,631,576 A | 5/1997 | Lee et al. |
| 5,672,985 A | 9/1997 | Lee |
| 5,675,262 A | 10/1997 | Duong et al. |
| 5,724,276 A | 3/1998 | Rose et al. |
| 5,761,099 A | 6/1998 | Pedersen |
| 5,818,255 A | 10/1998 | New et al. |
| RE35,977 E * | 12/1998 | Cliff et al. .................. 708/235 |
| 5,889,411 A | 3/1999 | Chaudhary |
| 5,898,319 A | 4/1999 | New |
| 5,898,602 A | 4/1999 | Rothman et al. |
| 5,909,126 A | 6/1999 | Cliff et al. |
| 5,920,202 A | 7/1999 | Young et al. |
| 5,926,036 A | 7/1999 | Cliff et al. |
| 5,999,016 A | 12/1999 | McClintock et al. |

(Continued)

OTHER PUBLICATIONS

E. Ahmed et al., "The Effect of LUT and Cluster Size on Deep-Submicron FPGA Performance and Density", FPGA '2000 Monterey Ca, pp. 3-12.

(Continued)

*Primary Examiner*—Tan V. Mai
(74) *Attorney, Agent, or Firm*—Beyer Weaver LLP

(57) ABSTRACT

According to some embodiments, arithmetic structures in logic elements result from combining inverters and pass gates (or other multiplexing hardware) with LUT hardware. According to other embodiments, arithmetic structures in logic elements result from combining dedicated adder hardware (e.g., including XOR units) and fracturable LUT hardware. According to other embodiments, arithmetic structures in logic elements result from providing complementary input connections between multiplexers and LUT hardware. In this way, the present invention enables the incorporation of arithmetic structures with LUT structures in a number of ways.

56 Claims, 19 Drawing Sheets

U.S. PATENT DOCUMENTS

| | | | |
|---|---|---|---|
| 6,021,423 | A | 2/2000 | Nag et al. |
| 6,051,992 | A | 4/2000 | Young et al. |
| 6,107,827 | A | 8/2000 | Young et al. |
| 6,118,300 | A | 9/2000 | Wittig et al. |
| 6,154,052 | A | 11/2000 | New |
| 6,154,053 | A | 11/2000 | New |
| 6,154,055 | A | 11/2000 | Cliff et al. |
| 6,157,209 | A | 12/2000 | McGettigan |
| 6,191,610 | B1 | 2/2001 | Wittig et al. |
| 6,191,611 | B1 | 2/2001 | Altaf |
| 6,288,568 | B1 | 9/2001 | Bauer et al. |
| 6,288,570 | B1 | 9/2001 | New |
| 6,297,665 | B1 | 10/2001 | Bauer et al. |
| 6,323,682 | B1 | 11/2001 | Bauer et al. |
| 6,400,180 | B2 | 6/2002 | Wittig et al. |
| 6,476,634 | B1* | 11/2002 | Bilski .................. 326/40 |
| 6,501,296 | B2 | 12/2002 | Wittig et al. |
| 6,943,580 | B2* | 9/2005 | Lewis et al. ............. 326/40 |
| 6,989,687 | B2* | 1/2006 | Or-Bach ................. 326/38 |
| 7,062,520 | B2* | 6/2006 | Rupp .................... 708/230 |
| 2003/0055852 | A1* | 3/2003 | Wojko ................... 708/230 |
| 2004/0251930 | A1* | 12/2004 | Ngai et al. ............. 326/41 |
| 2005/0127944 | A1* | 6/2005 | Lewis et al. ............ 326/41 |

OTHER PUBLICATIONS

D. Cherepacha et al., "DP-FPGA: An FPGA Architecture Optimized for Datapaths", VLSI Design 1996, vol. 4, No. 4, pp. 329-343.

S. Kaptanoglu et al., "A new high density and very low cost reprogrammable FPGA architecture", FPGA '99 Monterey Ca, pp. 3-12.

J. Rose et al., "Architecture of Field-Programmable Gate Arrays: The Effect of Logic Block Functionality on Area Efficiency", J. of Solid-State circuits, vol. 25, No. 5, Oct. 1990, pp. 1217-1225.

J. L. Kouloheris et al., "FPGA Area versus Cell Granularity-Lookup Tables and PLA Cells", FPGA '92, pp. 9-14.

"FLEX 8000 Programmable Logic Device Family", Altera Corp. Jun. 1999, ver. 10.01, pp. 349-364.

"FLEX 10K Embedded Programmable Logic Device Family", Altera Corp. Mar. 2001, ver. 4.1, pp. 1-28.

"FLEX 6000 Programmable Logic Device Family", Altera Corp., Mar. 2001, ver. 4.1, pp. 1-17.

"Mercury Programmable Logic Device Family", Altera Corp., Mar. 2002, ver. 2.0, pp. 1-34.

"APEX 20K Programmable Logic Device Family", Altera Corp., Feb. 2002, ver. 4.3, pp. 1-29.

"Virtex™ —II Platform FPGAs: Detailed Description", XILINX, Advance Product Specification, v2.1.1, Dec. 6, 2002, pp. 1-40.

"Stratix FPGA Family Data Sheet", Altera Corp., Preliminary Information, Dec. 2002, ver. 3.0, pp. 1, 11-19.

"ORCA® Series 2 Field-Programmable Gate Arrays", Data Sheet, Lattice Semiconductor Corp., Jan. 2003, title sheet, pp. 2-26.

* cited by examiner

ARITHMETIC STRUCTURES FOR PROGRAMMABLE LOGIC DEVICES

BACKGROUND OF THE INVENTION

1. Field of Invention

The present invention relates to logic elements for use with programmable logic devices or other similar devices.

2. Description of Related Art

Programmable logic devices (PLDs) (also sometimes referred to as CPLDs, PALs, PLAs, FPLAs, EPLDs, EEPLDs, LCAs, FPGAs, or by other names), are well-known integrated circuits that provide the advantages of fixed integrated circuits with the flexibility of custom integrated circuits. Such devices are well known in the art and typically provide an "off the shelf" device having at least a portion that can be electrically programmed to meet a user's specific needs. Application specific integrated circuits (ASICs) have traditionally been fixed integrated circuits, however, it is possible to provide an ASIC that has a portion or portions that are programmable; thus, it is possible for an integrated circuit device to have qualities of both an ASIC and a PLD. The term PLD as used herein will be considered broad enough to include such devices.

PLDs typically include blocks of logic elements, which are sometimes referred to as logic array blocks (LABs) or "configurable logic blocks" (CLBs). Logic elements (LEs), which are also referred to by other names such as "logic circuits" or "logic cells", may include a look-up table (LUT), product term, carry-out chain, register, and other elements.

Logic elements, including LUT-based logic elements, typically include configurable elements holding configuration data that determine the particular function or functions carried out by the logic element. A typical LUT circuit may include RAM bits that hold data (a "1" or "0"). However, other types of configurable elements may be used. Some examples may include static, magnetic, ferro-electric or dynamic random access memory, electrically erasable read-only memory, flash, fuse, and anti-fuse programmable connections. The programming of configuration elements could also be implemented through mask programming during fabrication of the device. While mask programming may have disadvantages relative to some of the field programmable options already listed, it may be useful in certain high volume applications. For purposes herein, the generic term "memory element" will be used to refer to any programmable element that may be configured to determine functions implemented by a PLD.

As discussed above, PLDs are commonly constructed using a lookup table (LUT) as the basic logic element. For example, a K-input lookup table (K-LUT) typically includes 2K programmable memory elements, and a 2K to 1 multiplexer, selecting one of the storage elements under the control of the K select inputs to the multiplexer. These K inputs can be considered to be the inputs to a K-input logic function which can implement any particular required logic function by setting the contents of the memory elements to the appropriate values.

There is a tradeoff between cost and speed of a logic circuit constructed with LUTs. Typically the cost of each LUT grows exponentially with the choice of K, but the number of LUTs required to build a logic circuit decreases more slowly with larger values of K. However, the number of LUTs that are in series for a larger value of K will be reduced, making the logic circuit faster. For example, with K=4, sixteen memory elements and a 16:1 multiplexer are required to build a single LUT, and for K=6, sixty-four memory elements and a 64:1 multiplexer are required. A given logic circuit might require one-thousand 4-LUTs, but only eight-hundred 6-LUTs. Under these assumptions, more hardware is required to construct the 6-LUT logic elements because the reduced number of LUTs is insufficient to compensate for the larger complexity of each LUT. However, the increased hardware requirements for the 6-LUT circuitry are offset by a reduction in the delay. The longest path through a logic circuit might be ten 4-LUTs versus eight 6-LUTs. Thus the 6-LUT version of the circuit might be larger, but faster. Further, the 6-LUT circuit would likely require less programmable routing in a PLD, offsetting some of its higher cost.

One reason for the lack of efficiency of larger LUTs is that not all logic functions will use all K inputs. For the example described above, the eight-hundred 6-LUTs might actually include three-hundred 6-input functions, three-hundred 5-input functions, one-hundred 4-input functions, and one-hundred 3-input functions. Thus, the LE based on 6-LUTs is only being used to its fullest extent in three-hundred out of eight-hundred instances.

In addition to LUT operations, some PLDs have included specialized circuitry to perform arithmetic operations efficiently. However, these examples have typically been limited to simple arithmetic operations (e.g., an addition of two inputs) and have generally not exploited internal LUT structures. Increasing the capability of a logic element to perform more complex arithmetic functions while adding only a small amount of additional logic can significantly increase the effective logic density of a PLD and thereby decrease costs.

Thus, there is a need for logic elements that incorporate arithmetic structures with conventional LUT structures to provide greater functionality.

SUMMARY OF THE INVENTION

According to some embodiments, arithmetic structures in logic elements result from combining inverters and pass gates (or other multiplexing hardware) with LUT hardware. According to other embodiments, arithmetic structures in logic elements result from combining dedicated adder hardware (e.g., including XOR units) and fracturable LUT hardware. According to other embodiments, arithmetic structures in logic elements result from providing complementary input connections between multiplexers and LUT hardware. In this way, the present invention enables the incorporation of arithmetic structures with LUT structures in a number of ways. The present invention provides flexibility for combining functions in logic elements including various arithmetic functions, relative speeds and costs. In some operational settings, the preferred choice will depend on the typical mix of functions to be implemented in a PLD and the relative importance of speed and area.

DETAILED DESCRIPTION OF EXEMPLARY EMBODIMENTS

Inverters and Pass Gates

Arithmetic structures can result from combining inverters and pass gates (or other multiplexing hardware) with LUT hardware in a logic element.

Figure 1:
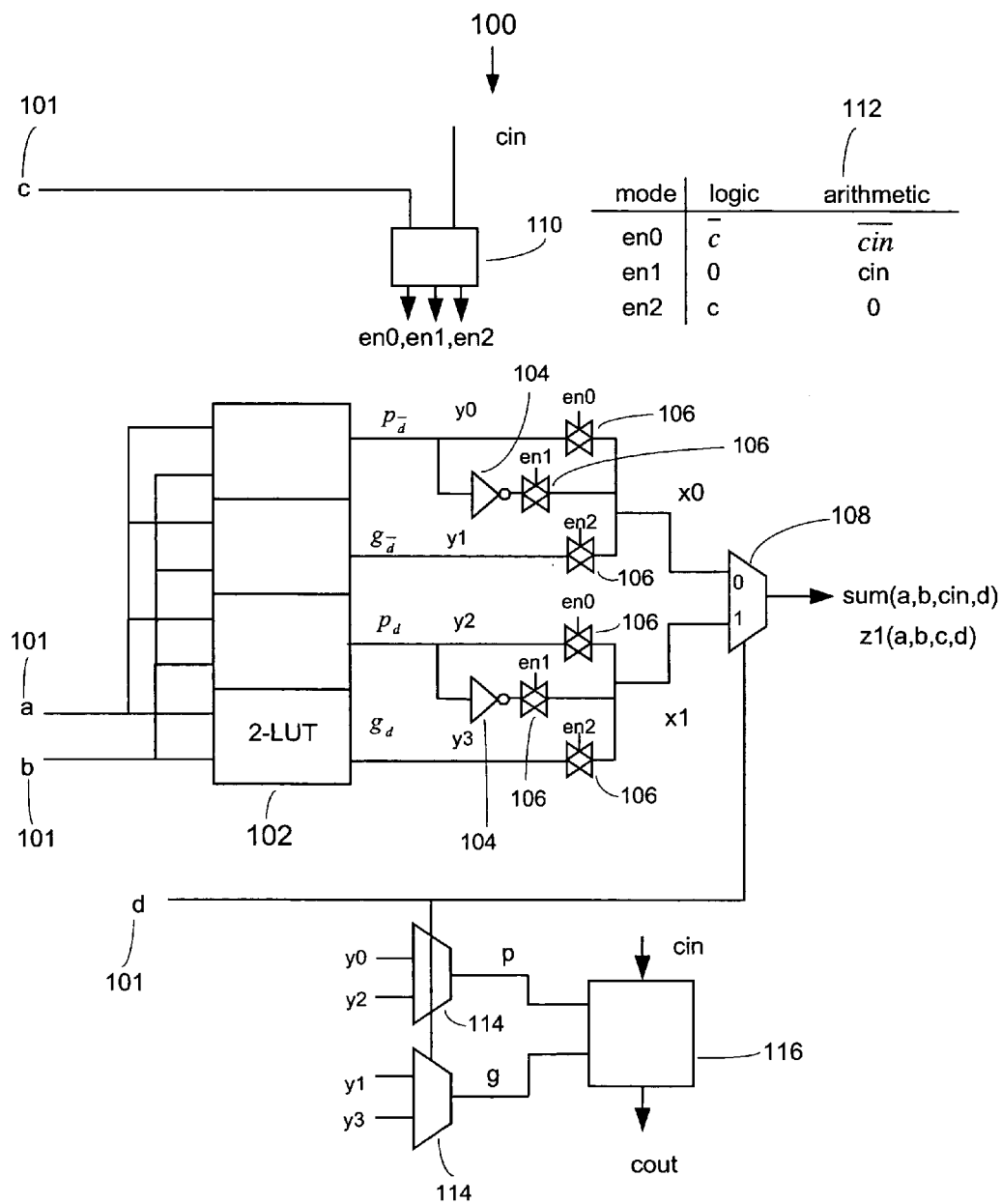
FIG. 1 shows an embodiment that includes inverters, pass gates, and LUT hardware.

FIG. 1 shows a logic element (LE) 100 according to an embodiment of the present invention where a single 4-LUT is broken down into (or considered as) four 2-LUTs. The logic element 100 includes four control inputs (or controls) 101 denoted as a, b, c, and d. Four 2-LUTs 102 are connected to two inverters 104 and six pass gates 106. The four 2-LUTs 102 provide four output values, y0, y1, y2, and y3, and the six pass gates 106 are arranged to provide two output values, x0 and x1. An output multiplexer 108 receives input from the pass gates 106 and produces one of two different outputs depending on the mode of operation: an arithmetic mode and a logic mode.

The pass gates 106 are controlled by pass gate controls e0, e1, and e2 so that when a pass gate control is zero the signal does not pass and when a pass gate control is one the signal does pass. A pass-gate control element 110 determines pass gate controls en0, en1, en2 for the pass gates 106 from the value of c in the logic mode and from the value of cin in the arithmetic mode as shown in the adjacent logic table 112. Preferably a configuration bit in the signal generation for en0, en1, and en2 controls how these signals are generated, depending on whether the logic element 100 is in arithmetic or logic mode. These control values enable the logic element 100 to provide a general logic function in the logic mode and an arithmetic sum in the arithmetic mode. As provided by the table 112, single values pass to x0 and x1, the inputs of the output multiplexer 108, in both the logic and arithmetic modes.

For the arithmetic mode, two multiplexers 114 are connected to y0, y1, y2, and y3, the output values of the 2-LUTs 102. A carry chain element 116 is connected to the multiplexers 114 as well as a carry-chain input cin and a carry-chain output cout.

In the conventional logic mode of operation, the output multiplexer 108 produces $z1(a,b,c,d)$, a logical function of the four control inputs a, b, c, d. The pass gate controls are set by the pass-gate control element 110 so that the four controls 101, the four 2-LUTs 102, the two inverters 104, and the six pass gates 106 form a conventional 4-LUT. The penultimate stage of this LUT is controlled by the c input 101 of the LUT so that the signals x0 and x1 are two 3-LUT outputs and the final stage is controlled by the d input 101 in the output multiplexer 108.

In the arithmetic mode of operation, the output multiplexer 108 produces $$\text{sum}(a,b,\text{cin},d) = f0(a,b,d) \oplus f1(a,b,d) \oplus \text{cin},$$

an arithmetic sum of two logical functions of the control inputs a, b, and d, where cin is the carry-chain input and cout is the corresponding carry-chain output. The functions f0 and f1 are not stored directly in the LUT. Instead, the propagate and generate functions, p and g, are stored. These are well known carry logic signals defined in terms of f0 and f1 as:

$$p(a,b,d) = f0(a,b,d) \oplus f1(a,b,d),$$

$$g(a,b,d) = f0(a,b,d) \cdot f1(a,b,d).$$

Because f0 and f1 are both known functions, the p and g functions can be computed in software and loaded into the LUT contents (i.e., the memory elements of the 2-LUTs 102). More precisely, the first and third of the 2-LUTs 102 are used to compute the propagate function p under the two conditions d=0 (shown as $p_{\bar{d}}$) and d=1 (shown as $P_d$). And similarly the second and fourth of the 2-LUTs 102 are used to compute the generate function g under the two conditions d=0 (shown as $g_{\bar{d}}$) and d=1 (shown as $g_d$). The pass gate controls are set by the pass-gate control element 110 so that the pass gates 106 generate x0 as cin$\oplus p_{\bar{d}}$ and x1 as cin$\oplus p_d$ respectively. The final stage of multiplexing at the output multiplexer 108 uses d 101 to select for cin$\oplus$p, which is the sum output. Additionally, the carry-chain element 116 implements the function cout=g|p·cin.

The embodiment shown in FIG. 1 can be generalized to embodiments with higher-order LUTs and more inputs because a K-LUT may be considered as 4 LUTs of size K−2. That is, the four 2-LUTs 102 and four controls (a, b, c, d) shown in FIG. 1 can be replaced by four K-LUTS and K+2 controls (i.e., K controls replacing the two inputs (a and b) to the 2-LUTs 102). Embodiments according this approach advantageously can implement any arithmetic function of K−1 inputs so that the output appears on the same electrical path as the regular logic signal and no extra multiplexing is required. Compared to a conventional LUT, extra pass gates (or transmission gates) and multiplexers are required, as well as dedicated carry chain hardware.

It can also be appreciated that although the carry chain element 116 is illustrated for a single bit ripple carry, the use of propagate and generate functions (p and g) allows any one of a number of multi-bit carry chain structures to be implemented.

Dedicated Adder Hardware and Fracturable LUT Hardware

Arithmetic structures can result from combining dedicated adder hardware (e.g., including XOR units) and fracturable LUT hardware in a logic element.

Fracturable LUTs may be understood as modifications or adaptations of conventional LUTs. In general, a fracturable LUT includes a conventional LUT design that has been modified to include additional outputs possibly with additional multiplexers.

In general, a conventional K-LUT includes a configuration of K control inputs and $2^K$ memory elements together with associated multiplexing. FIG. 2A shows a conventional 4-LUT 200, which includes sixteen memory elements 219, and 4:1 multiplexers 250, 240. Each memory element 219 can hold one data bit (i.e., 1 or 0) and each is coupled to provide that bit to an input of a multiplexer 250 as shown. Two control inputs of each multiplexer 250 are coupled to, respectively, an input A 214 and an input B 213 of the 4-LUT 200. The output of each of these multiplexers 250 is coupled to an input of another 4:1 multiplexer 240 as shown. Two control inputs of this multiplexer 240 are coupled to, respectively, an input C 211 and an input D 212 of the 4-LUT 200. The output of this multiplexer 240 provides the final output 215 of the 4-LUT 200.

Those skilled in the art will appreciate that a 4-LUT such as the 4-LUT 200 of FIG. 2A can provide a complete function of four input signals. "Complete" in this context simply means that the memory elements 219 can be programmed to configure the 4-LUT 200 to perform any four-input function. That is, the 4-LUT 200 can be configured by programming its memory elements (e.g., loading values into those elements) so that the output signal Y 215 is any one of a full range of logical functions of the input signals A 214, B 213, C 211 and D 212 as will be appreciated by those skilled in the art.

Figure 2B:
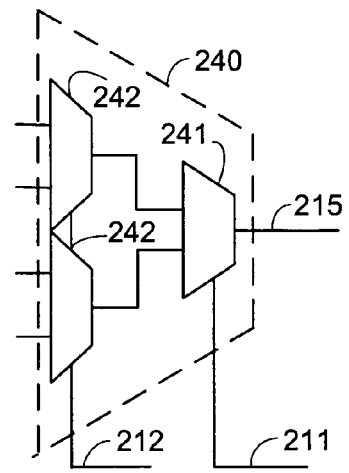
FIG. 2B shows further detail of the 4:1 multiplexer shown in FIG. 2A.
Figure 2A:
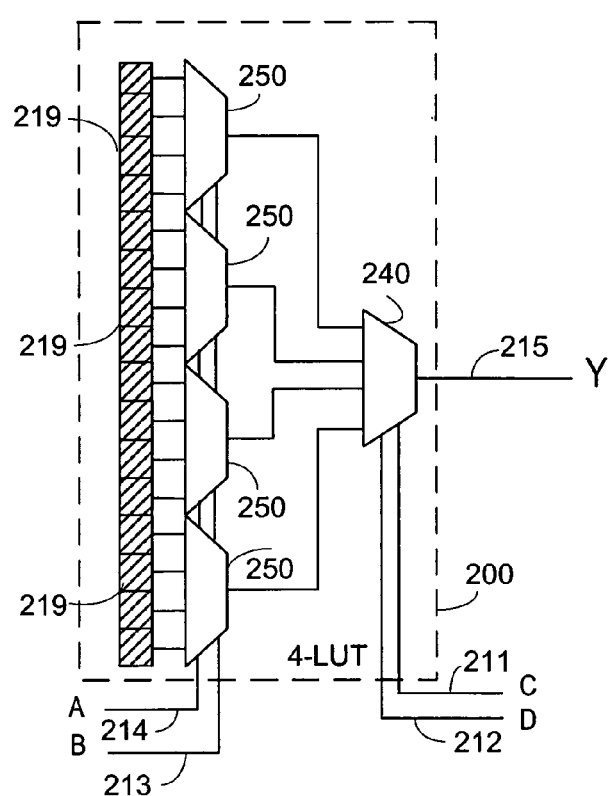
FIG. 2A shows a conventional 4-LUT.

FIG. 2B illustrates the "tree" of 2:1 multiplexers 241, 242 that make up the final 4:1 multiplexer 240. (The other 4:1 multiplexers 250 can be similarly characterized.) Control inputs 211, 212 of the multiplexers 241, 242 correspond to inputs of the 4-LUT 200. An output at a higher level of multiplexers 242 (i.e., closer to the memory elements 219) feeds into the next level 241 closer to the output 215. As will be appreciated by those skilled in the art, one can consider the "tree" of the 2:1 multiplexers 241, 242 making up the final 4:1 multiplexer 240 as part of a larger 2:1 multiplexer tree that characterizes the 4-LUT 200. More generally, a typical LUT circuit has a multiplexer tree that may be referenced by "levels" of 2:1 multiplexers provided relative to the LUT circuit's output.

For example, the multiplexer 241 closest to the output 215 may be called a first level of multiplexers in the overall 2:1 multiplexer tree of the 4-LUT 200 and the next set of two multiplexers 242 may be called a second level in that tree. By extending the structure of FIG. 2B to FIG. 2A, there are four levels of 2:1 multiplexers in the 4-LUT 200. The 4-LUT 200 has a third level that includes four 2:1 multiplexers (i.e., one for each multiplexer 150) with control inputs coupled to logic input B 213, and a fourth level that includes eight 2:1 multiplexers (i.e., two for each multiplexer 150) with control inputs coupled to logic input A 214.

As will be appreciated by those skilled in the art, a 4:1 multiplexer may be implemented in a manner other than the illustrated multiplexer 240, which has a "tree" of three 2:1 multiplexers 241, 242 at two distinct levels. For example, a 4:1 multiplexer might be implemented by four pass gates with each of the pass gates being controlled by the decoded output of two control signals. In such an example, the four pass gates themselves would not be differentiated by levels relative to each other, however, the 4:1 multiplexer would effectively implement two levels of 2:1 multiplexing.

Figure 3:
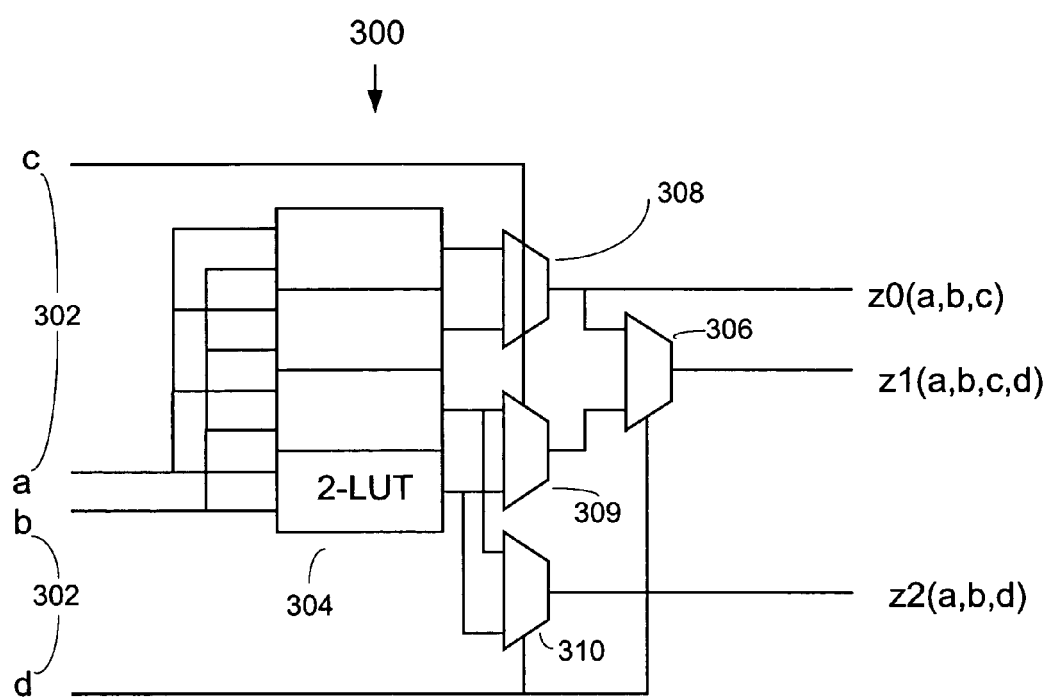
FIG. 3 shows a fracturable 4-LUT.

The principle of a fracturable LUT is illustrated in FIG. 3, which shows a 4-LUT that has been adapted as a fracturable LUT 300 by including additional output functions. The LUT 300 includes four controls 302 and four 2-LUTs 304. (Each 2-LUT 304 can be understood as a configuration of four memory elements 219 together with a 4:1 multiplexer 250 as shown in FIG. 2A). An output multiplexer 306 (or first-level multiplexer) is connected to two internal multiplexers 308, 309 (or second-level multiplexers) that are connected to the 2-LUTs. These components 302, 304, 306, 308, 309 define a 4-LUT where the output multiplexer 306 provides $z1(a, b, c, d)$, a complete function of the four controls 302.

The fracturable LUT 300 includes two additional output functions. A first additional output function $z0(a,b,c)$ is provided by the first internal multiplexer 308, and a second additional output function $z2(a,b,c)$ is provided by an additional internal multiplexer 310.

The additional output functions provide additional output capabilities so that, for example, in one operational mode the LUT 300 provides a complete function of the four controls (i.e., $z1(a,b,c,d)$) while in another mode the top half of the LUT 300 provides a complete function of three controls (i.e., $z0(a,b,c)$) and the bottom half of the LUT 300 also provides a complete function of three controls (i.e., $z2(a,b,d)$). Thus the LUT 300 can implement two 3-input functions that share the inputs a and b. It can be appreciated that there are a variety of ways to select pieces of a LUT to use to provide different numbers of functions with different numbers of signals used for their inputs.

Figure 4A:
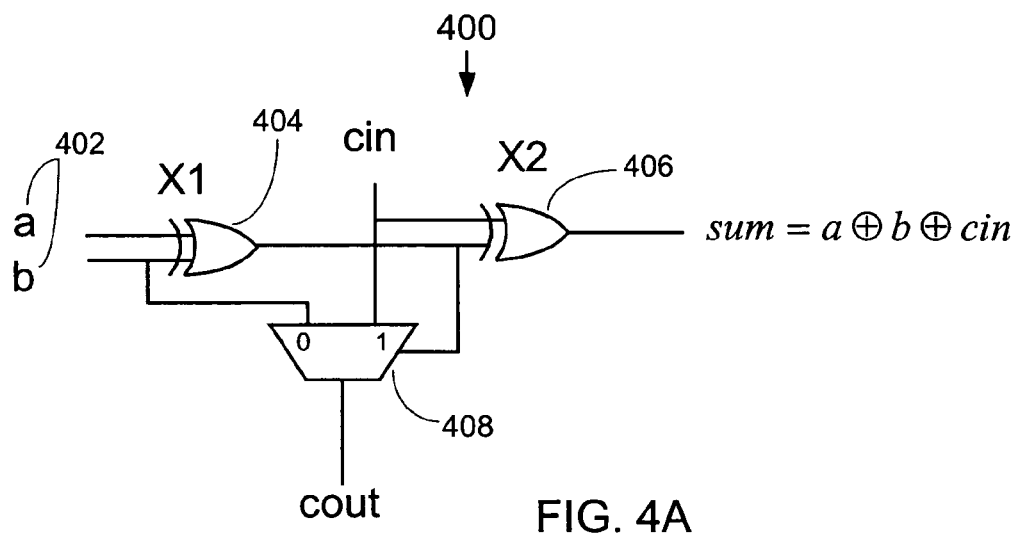
FIG. 4A and FIG. 4B show two versions of an adder.
Figure 4B:
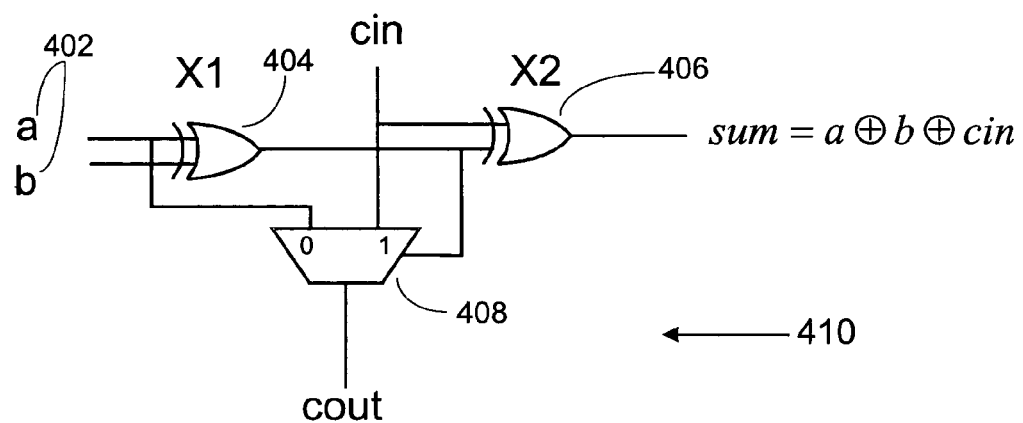

Dedicated adder hardware can be configured for example by combining XOR units and multiplexers. In FIG. 4A an adder 400 includes two controls a and b 402, a first XOR unit (gate X1) 404, a second XOR unit (gate X2) 406, and a multiplexer 408. The first XOR unit 402 provides input b to the multiplexer 408, which is controlled by the second XOR unit 406. The multiplexer also receives input from a carry-out input cin 410 and provides as an output a carry-out output cout 412. The second XOR unit 406 provides an arithmetic sum computed as sum=a⊕b⊕cin, where the corresponding carry-chain output is cout 412. A similar arrangement of elements is shown in FIG. 4B, where the first XOR unit 402 provides input a to the multiplexer 408.

In each of these examples, the function a⊕b is used to select between the cin and one of the two inputs a or b. It can be seen that it does not matter whether a or b is used for the input to the multiplexer since, if a⊕b is false, which is the case when the multiplexer is selecting the a or b signal, then a and b must have the same value.

In the embodiments presented below, fracturable LUTs are combined with alternative versions of addition hardware such as those illustrated in FIGS. 4A and 4B. The various adder schemes primarily differ in the aspect of whether gate X1 is constructed with dedicated hardware, or performed by the LUT, and how the LUT is fractured into various pieces to generate the signals that are then added. One or both of the signals a and b may be produced by a LUT, and in the case that only one is produced by the LUT, the other may be an input to the LE.

Figure 5:
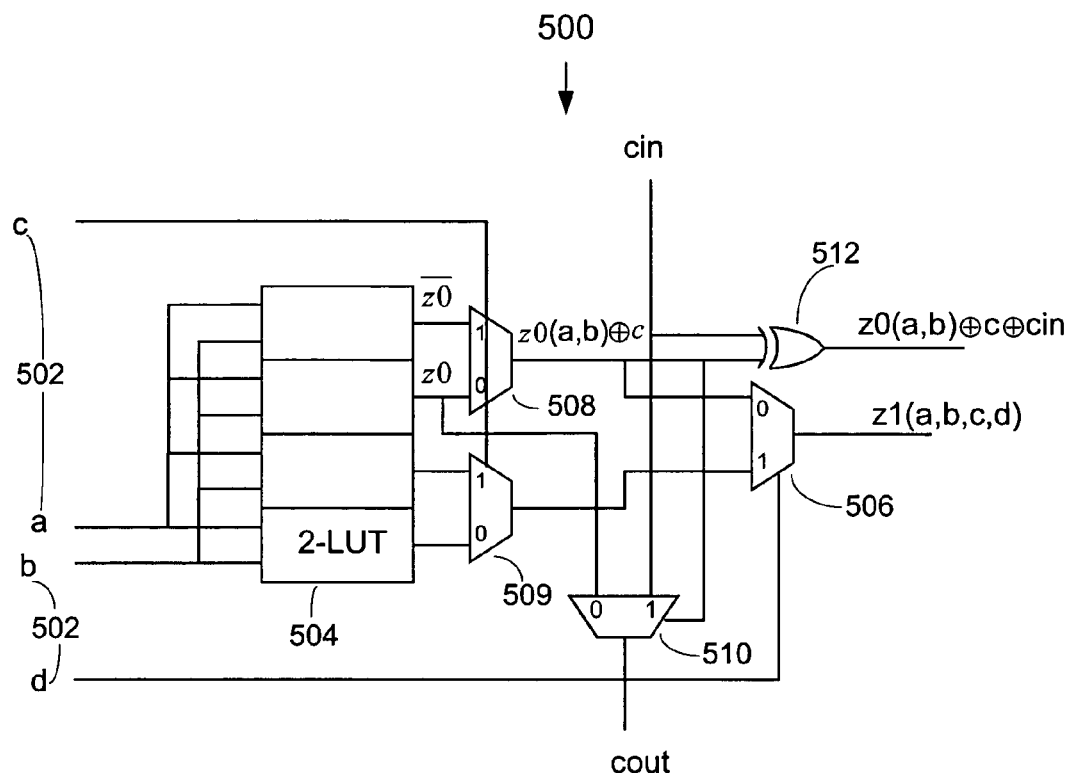
FIG. 5 shows an embodiment that includes fracturable LUT hardware and dedicated adder hardware.

FIG. 5 shows a logic element 500 according to an embodiment of the present invention in which dedicated adder hardware is combined with a fracturable LUT. The logic element 500 includes elements corresponding to 4-LUT including four controls a, b, c, and d 502, four 2-LUTs 504, an output multiplexer 506, and two internal multiplexers 508, 509. A carry-out select multiplexer 510 is connected to one of the 2-LUTs 504, the first internal multiplexer 508, a carry-chain input cin, and a carry-chain output cout. An XOR unit 512 is also connected to the first internal multiplexer 508 and the carry-chain input cin.

In a conventional logic mode of operation, the output multiplexer 506 provides a logic function of the controls: $z1(a,b,c,d)$.

In an arithmetic mode of operation, the logic element 500 uses a dedicated XOR gate 512 to perform the output function and a multiplexer 510 to perform the carry-out function. Two of the 2-LUTs 504 are used to compute a function z0 and its complement. Thus the first internal multiplexer 508 controlled by c causes the 3-LUT to compute $p=z0(a,b)\oplus c$. The XOR 512 and carry-out select multiplexer 510 compute the arithmetic function sum=$p\oplus cin$ and the carry-chain output cout=$p\cdot cin|\overline{p}\cdot z0$. This permits the logic element 500 to generate any arithmetic function of the form $z0(a,b)+c$. Further by setting d=1, a logic function of three controls, $z1(a,b,c)=z1(a,b,c,1)$, is provided.

In contrast to the embodiment shown in FIG. 1, this embodiment uses less hardware and avoids any extra multiplexer delay on the c input path. However, it requires the use of an additional output from the LE, which may incur additional delay in multiplexing from the LE 500 to the routing (not shown). This approach may be preferable if it is desirable to reduce the delay of the LE when used in random logic mode, but may be slower in arithmetic mode as compared with the embodiment shown in FIG. 1. This embodiment also implements fewer arithmetic functions, but allows the LE 500 to produce two distinct results $z0(a,b)+c$ as well as $z1(a,b,c)$ when the LE is used in arithmetic mode. Thus the embodiment shown in FIG. 5 has both advantages and disadvantages compared to the embodiment shown in FIG. 1 and may be preferable depending on the relative importance of each property.

Figure 6:
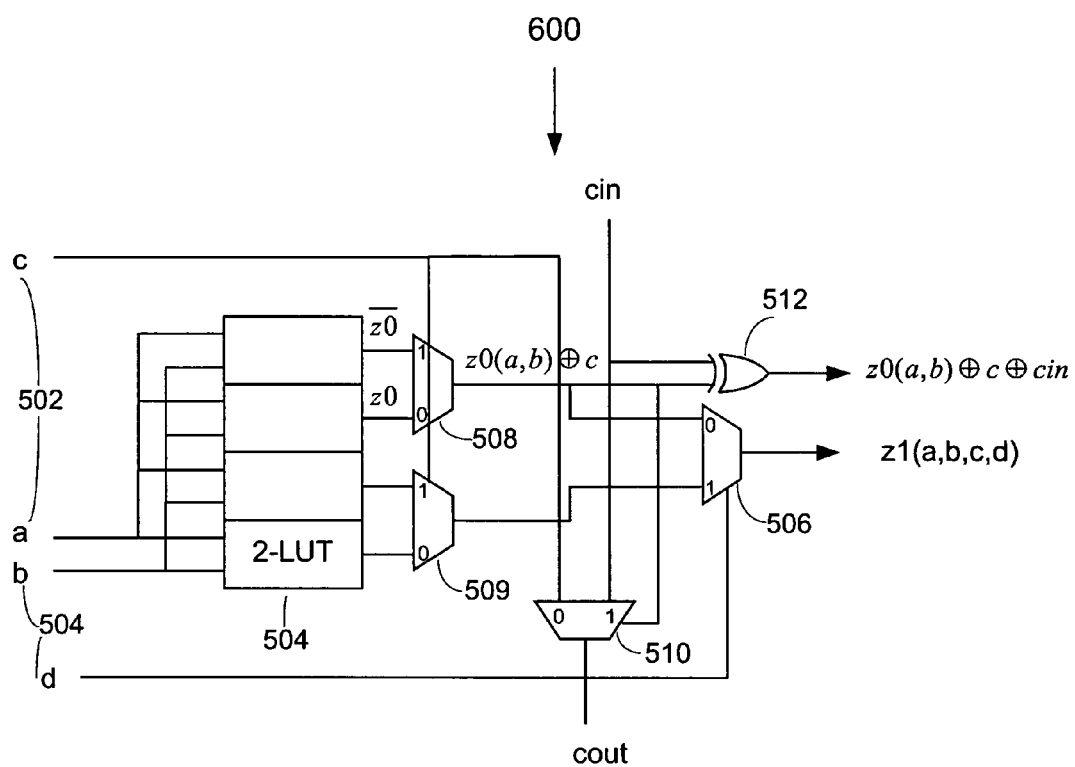
FIG. 6 shows an embodiment that includes fracturable LUT hardware and dedicated adder hardware.

In this embodiment a 4-LUT is fractured so that a 3-LUT is used to generate a function of two inputs which is XOR-ed with one of the controls c, which is denoted as an additive control. More generally, a K-LUT can be fractured so that a (K−1)-LUT is used to generate a function of (K−2) inputs which is XOR-ed with one of the controls FIG. 6 shows a logic element 600 according to an embodiment that is similar to the embodiment shown in FIG. 5. In FIG. 6 the carry-out select multiplexer 510 is connected to the additive control c 502 rather than a fractured output from the 2-LUTs 504 as shown in FIG. 5. The carry-chain output is cout=$p\cdot cin|\overline{p}\cdot c$.

Figure 7:
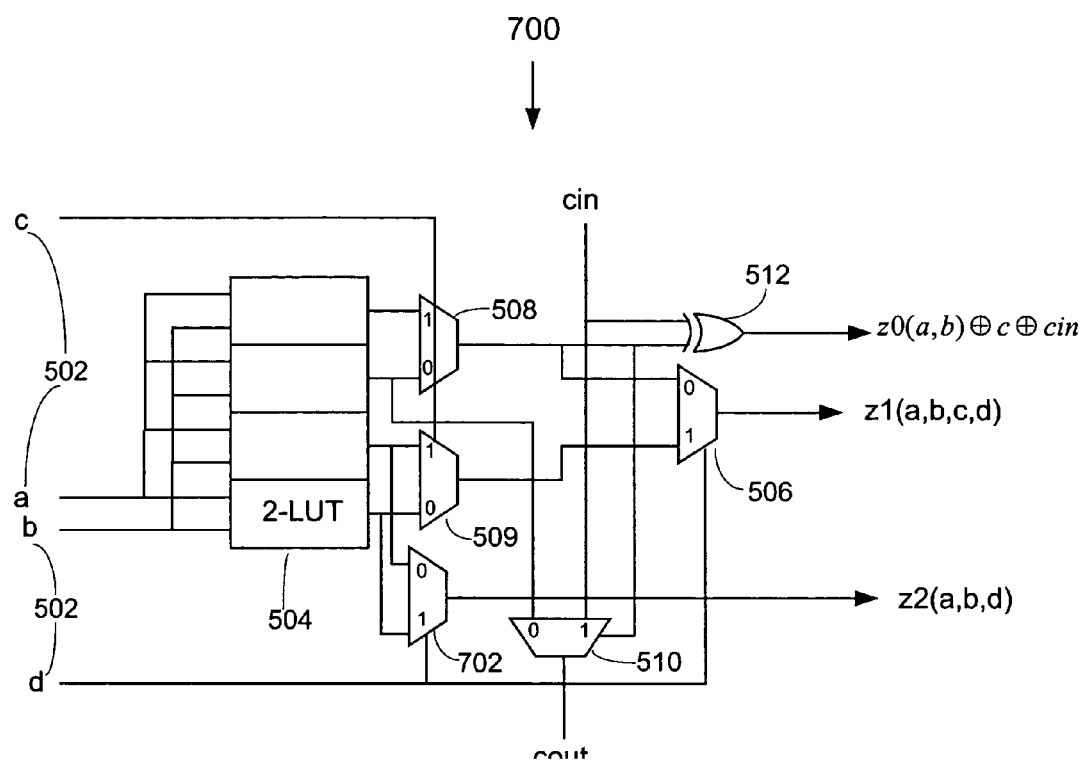
FIG. 7 shows an embodiment that includes fracturable LUT hardware and dedicated adder hardware.

FIG. 7 shows a logic element 700 according to an embodiment that is similar to the embodiment shown in FIG. 5. This embodiment includes an additional internal multiplexer 702 that is connected to two of the four 2-LUTs 504 and one of the controls d 502. This incremental modification enhances the logic element's flexibility so that, in arithmetic mode, the LE 700 can generate both the arithmetic function $z0(a,b)+c$ as well as a random logic function $z2(a,b,d)$. Since there are now two distinct inputs (c and d) used for these two functions, it is possible to combine two functions that share only two inputs (a and b).

Figure 8:
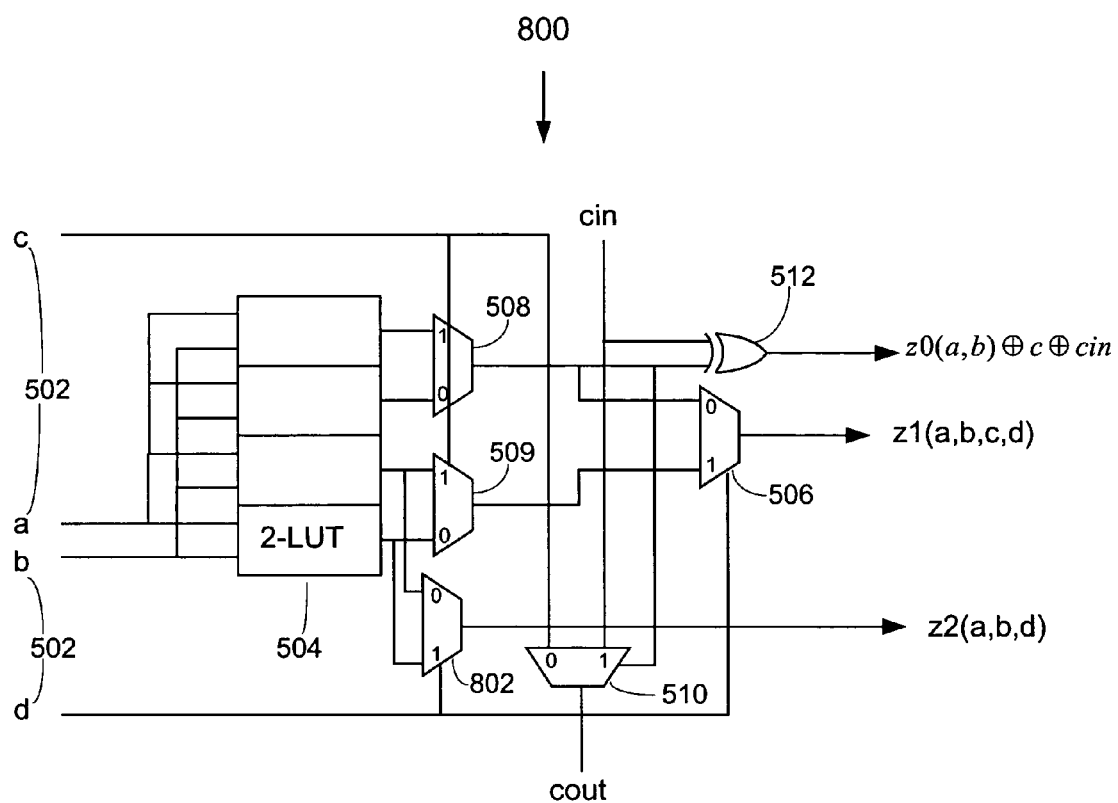
FIG. 8 shows an embodiment that includes fracturable LUT hardware and dedicated adder hardware.

FIG. 8 shows a logic element 800 according to an embodiment that is similar to the embodiment shown in FIG. 6. This embodiment includes an additional internal multiplexer 802 that is connected to two of the four 2-LUTs 504 and one of the controls d 502. Similarly as in the embodiment shown in FIG. 7, this incremental modification enhances the logic element's flexibility so that, in arithmetic mode, the LE 800 can generate both the arithmetic function $z0(a,b)+c$ as well as a random logic function $z2(a,b,d)$.

Figure 9:
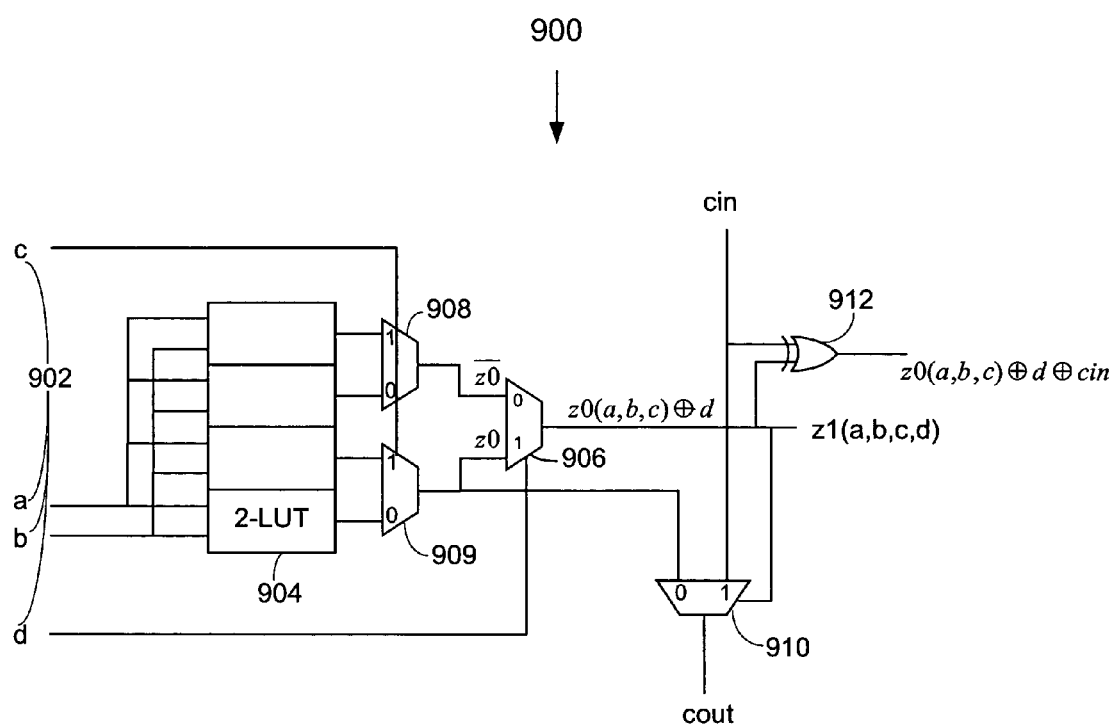
FIG. 9 shows an embodiment that includes fracturable LUT hardware and dedicated adder hardware.

FIG. 9 shows a logic element 900 according to another embodiment of the present invention. The logic element 900 includes elements corresponding to 4-LUT including four controls a, b, c, and d 902, four 2-LUTs 904, an output multiplexer 906, and two internal multiplexers 908, 909. A carry-out select multiplexer 910 is connected to the output multiplexer 906, the second internal multiplexer 909, a carry-chain input cin, and a carry-chain output cout. An XOR unit 912 is also connected to the output multiplexer 906 and the carry-chain input cin.

This embodiment is similar to the one shown in FIG. 5 except that the arithmetic operations are carried out one level further in the LUT structure. As a result, the logic element 900 can implement more powerful arithmetic functions of the form: $z0(a,b,c)+d$. However, this logic element 900 only implements a single function when in arithmetic mode as compared with the two functions enabled by the logic element 500 shown in FIG. 5.

In a conventional logic mode of operation, the output multiplexer 906 provides a logic function of the controls: $z1(a,b,c,d)$.

In an arithmetic mode of operation, the logic element 900 uses a dedicated XOR gate 912 to perform the output function and a multiplexer 910 to perform the carry-out function. The internal multiplexers 908, 909 are used to compute a function $z0(a,b,c)$ and its complement. The output multiplexer 906 controlled by d computes $p=z0(a,b,c)\oplus d$. The XOR 912 and carry-out select multiplexer 910 compute the arithmetic function sum=$p\oplus cin$ and the carry-chain output cout=$p\cdot cin|\overline{p}\cdot z0$. This permits the logic element 900 to generate any arithmetic function of the form $z0(a,b,c)+d$.

Figure 10:
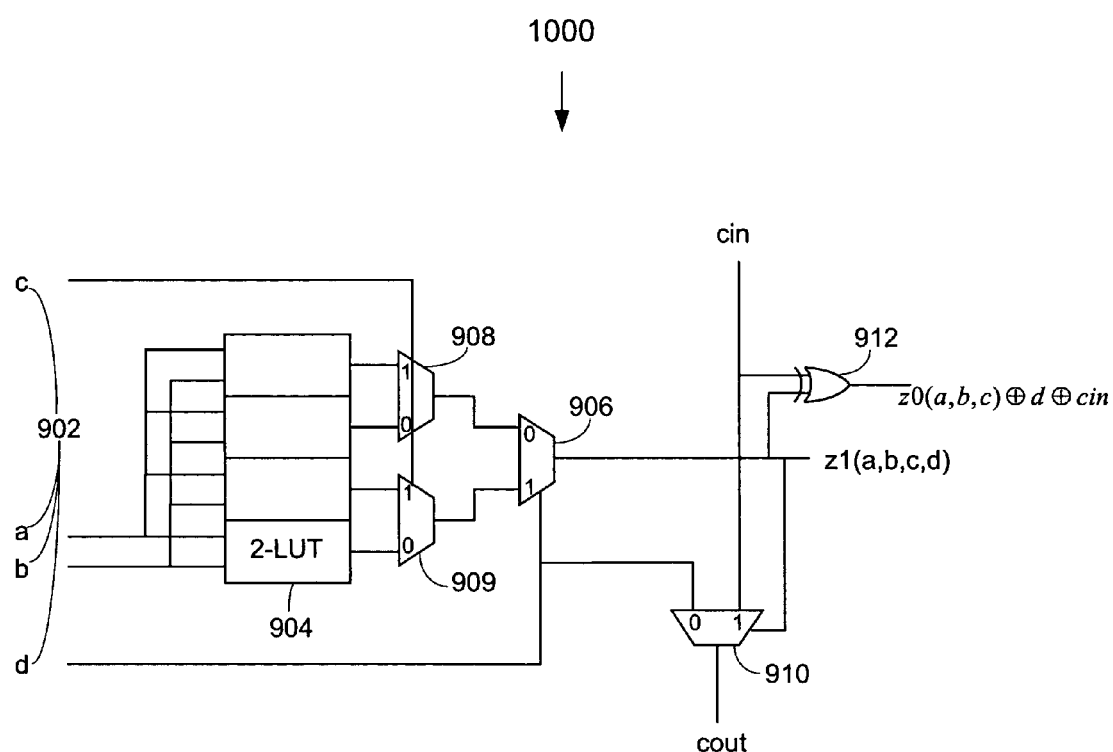
FIG. 10 shows an embodiment that includes fracturable LUT hardware and dedicated adder hardware.

FIG. 10 shows a logic element 1000 according to an embodiment that is similar to the embodiment shown in FIG. 9. However, the carry-out select multiplexer 910 is connected to the additive control d 902 rather than the second internal multiplexer 909.

Figure 11:
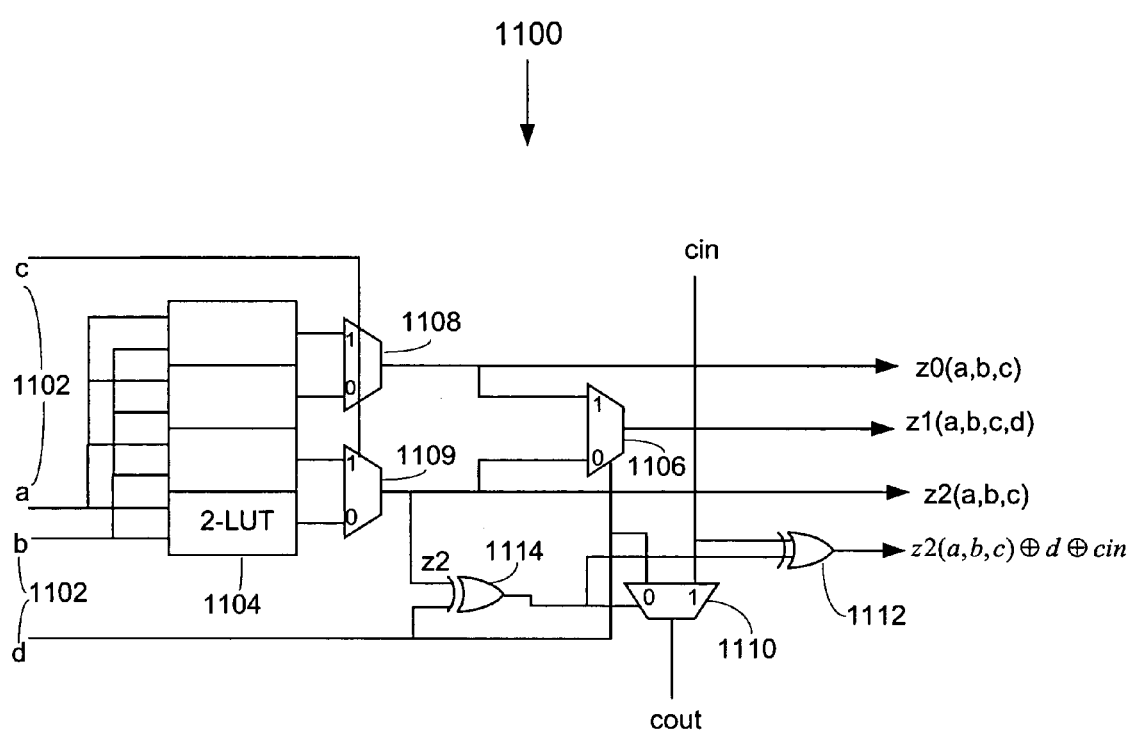
FIG. 11 shows an embodiment that includes fracturable LUT hardware and dedicated adder hardware.

The embodiments shown FIGS. 5–10 all use some portion of the LUT hardware to compute a logic function (z0) and its complement ($\overline{z0}$). As illustrated by the embodiments shown in FIGS. 11–12, the incorporation of a dedicated XOR unit (or XOR gate) enables the LUT hardware to compute an additional logic function. FIG. 11 shows a logic element 1100 according to another embodiment of the present invention. The logic element 1100 includes elements corresponding to 4-LUT including four controls a, b, c, and d 1102, four 2-LUTs 1104, an output multiplexer 1106, and two internal multiplexers 1108, 1109. A carry-out select multiplexer 1110 is connected to an additive control d 1102, a carry-chain input cin, and a carry-chain output cout. A first XOR unit 1112 is connected to the output multiplexer 1106 and the carry-chain input cin. A second XOR unit 1114 is connected to the second internal multiplexer 1109 the additive control d 1102, and the carry-out select multiplexer 1110.

In a conventional logic mode of operation, the output multiplexer 1106 provides a logic function of the controls: $z1(a,b,c,d)$.

In an arithmetic mode of operation, the first internal multiplexer 1108 produces a logic function $z0(a,b,c)$, the second internal multiplexer 1109 produces a logic function $z2(a,b,c)$, and the first XOR unit 1112 produces an arithmetic function sum=$z2(a,b,c)\oplus D\oplus d\oplus cin$, where cout is the corresponding carry-chain output given by cout=$p\cdot cin|\overline{p}\cdot d$. Because the logic element 1100 uses a dedicated XOR gate

1114 to compute p=z2(a,b,c)⊕d, this leaves the top half of the LUT hardware 1104 free to perform another function z0(a,b,c) as an output of the first internal multiplexer 1108. This allows both a 4-input arithmetic function and a 3-input logic function to be implemented in a single logic element, giving more power than previous schemes, but at a higher cost (i.e., greater hardware requirements). Although the logic element 1100 incorporates the second XOR unit 1114 with the lower half of the LUT hardware 1104, those skilled in the art will realize that other alternative embodiments result from incorporation of the second XOR unit 1114 with other portions of the LUT hardware 1104.

Figure 12:
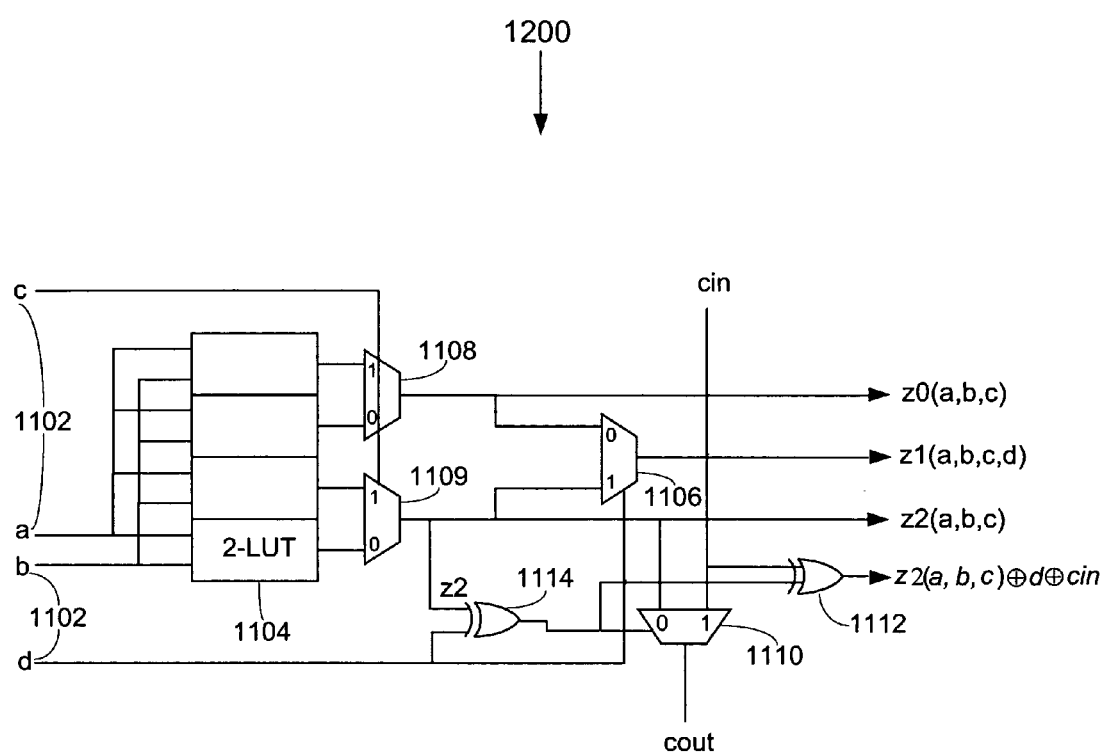
FIG. 12 shows an embodiment that includes fracturable LUT hardware and dedicated adder hardware.

FIG. 12 shows a logic element 1200 according to an embodiment that is similar to the embodiment shown in FIG. 11. However, the carry-out select multiplexer 1110 is connected to the second internal multiplexer 1109 rather than the additive control d 902.

Figure 13:
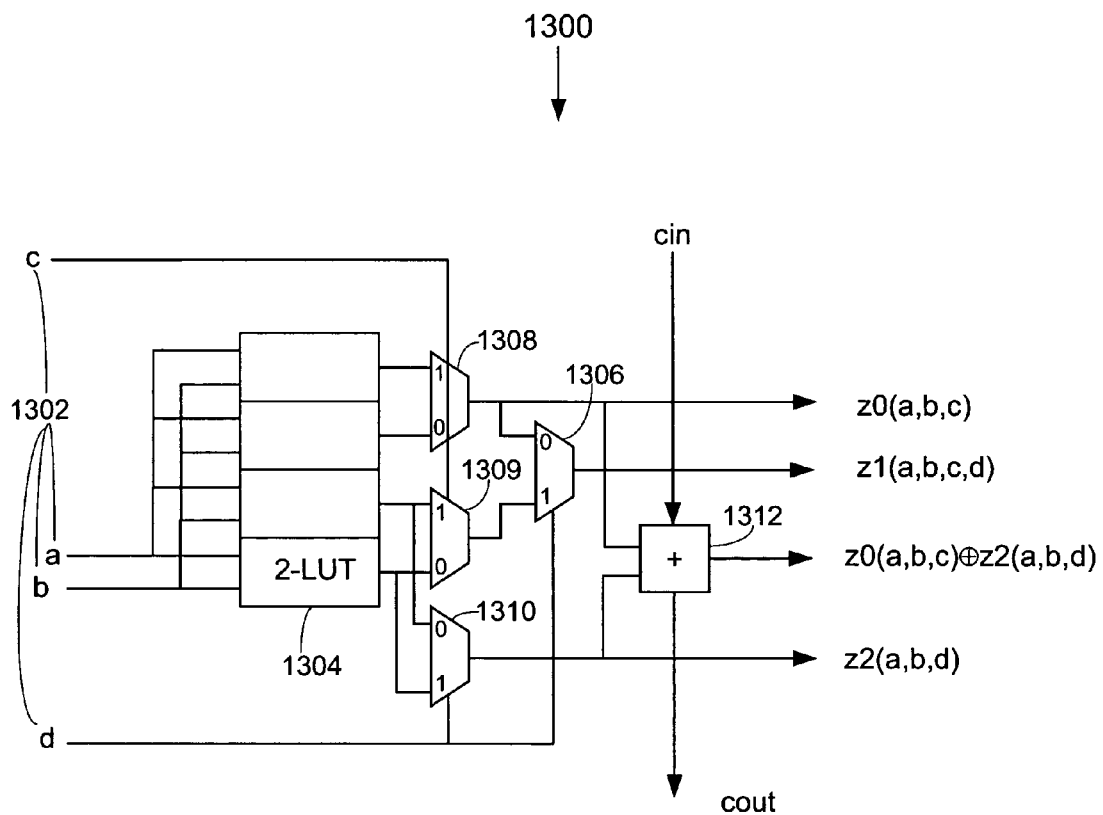
FIG. 13 shows an embodiment that includes fracturable LUT hardware and dedicated adder hardware.

Additional embodiments result from the incorporation of dedicated hardware for arithmetic rather than using one or more XOR gates as in the above embodiments. FIG. 13 shows a logic element 1300 according to another embodiment of the present invention. The logic element 1300 includes elements corresponding to 4-LUT including four controls a, b, c, and d 1302, four 2-LUTs 1304, an output multiplexer 1306, and two internal multiplexers 1308, 1309. The logic element 1300 includes an additional internal multiplexer 1310 that is connected to two of the four 2-LUTs 1304 and one of the controls d 502. An adder unit 1312 is connected to the first and third internal multiplexers 1308, 1310, a carry-chain input cin, and a carry-chain output cout.

In a conventional logic mode of operation, the output multiplexer 1306 provides a logic function of the controls: z1(a,b,c,d).

In an arithmetic mode of operation, the first internal multiplexer 1308 provides a logic function z0(a,b,c), the third internal multiplexer provides a logic function z2(a,b,d), and the adder unit 1312 provides an arithmetic function z0(a,b,c)+z2(a,b,d).

The embodiment of FIG. 13 takes the principle of adding dedicated hardware for arithmetic to the extreme. It uses a fracturable LUT to form the arithmetic operands as inputs to an adder unit 1312, which could for example be implemented according to the examples shown in FIGS. 4A–4B. More generally, this approach allows a K-input fracturable LUT to implement arithmetic functions that perform the addition of two (K−1)-input functions while using all K inputs to the LUT. As compared with other embodiments shown above, this approach is more powerful although it requires more hardware and an additional output from the logic element.

Multiplexers with Complementary Input Connections

Arithmetic structures in a logic element can result from providing complementary input connections between multiplexers and LUT hardware.

Figure 14:
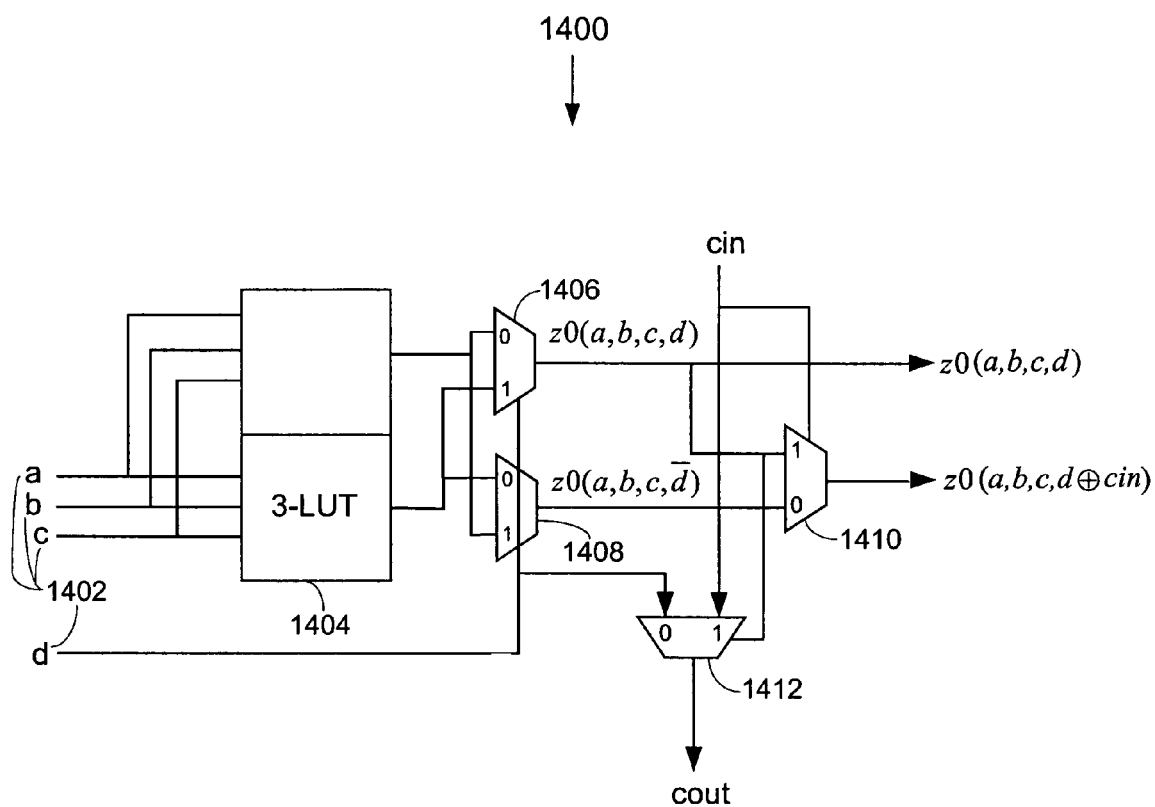
FIG. 14 shows an embodiment that includes LUT hardware and multiplexers with complementary input connections.

FIG. 14 shows a logic element 1400 according to an embodiment of the present invention. The logic element 1400 includes elements corresponding to 4-LUT including four controls a, b, c, and d 1402, two 3-LUTs 1404, and a first complementary multiplexer 1406. A second complementary multiplexer 1408 is connected to the 3-LUTs so that the first and second complementary multiplexers 1406, 1408 have complementary connections that lead to complementary outputs. (In this case the connections are switched, and the outputs are related by complementary values of the control d 1402 in the corresponding functional arguments; however, other combinations are possible.) A carry-out select multiplexer 1412 is connected to the control d 1402, the first complementary multiplexer 1406, a carry-chain input cin, and a carry-chain output cout. An output multiplexer 1410 connects to the first complementary multiplexer 1406, the second complementary multiplexer 1408, and the carry-chain input cin.

In a conventional logic mode of operation, the first complementary multiplexer 1406 provides a logic function of the controls: z0(a,b,c,d).

In an arithmetic mode of operation, output multiplexer 1410 provides an arithmetic function z0(a,b,c,d⊕cin), where cout is the corresponding carry-chain output. In this case, the control d 1402 is the additive control, and the complementary multiplexers 1406, 1408 provide functions that are complementary with respect to this argument (i.e., z0(a,b,c,d) and z0(a,b,c,d̄)). The output multiplexer 1410 is controlled by the carry-chain input cin to select between these two functions to produce z0(a,b,c,d⊕cin), an output form that includes the functional form f(a,b,c)⊕d⊕cin used in above embodiments (cf. FIGS. 5–12). Thus, this embodiment produces a relatively wide variety of arithmetic functions, with a relatively low hardware cost (e.g., lower than the embodiment of FIG. 13, which includes dedicated arithmetic hardware). Under some conditions it may be desirable to program the two 3-LUTs 1404 with identical values so that the complementary multiplexers 1406, 1408 and the output multiplexer 1410 produce an identical output that is independent of d and cin (i.e., z0(a,b,c)). Then, for example, the carry-chain output cout can be forced to the value of the control d 1402 (i.e., when z0(a,b,c)=0).

Use of Larger LUTs with Split Inputs

It can be appreciated that all of the above methods can be used with LUTs of any size. For example, in FIGS. 5–13 the four 2-LUTs with two control inputs (a,b) can be replaced by four K-LUTs with K control inputs.

For large LUTs, such as 6-LUTs, it may be desirable to perform two bits of arithmetic per LE to mitigate the larger cost of these LEs. Further, it may be desirable to perform two logic operations in a larger LE for similar reasons. For this purpose, the concept of a fracturable can be extended to also split the inputs of the LUT. Thus, a fracturable (K,M)-LUT has $2^K$ CRAM cells and can implement a single arbitrary K-input function. To increase its efficiency when a mix of function sizes is to be implemented, as will typically occur in a PLD, the (K,M)-LUT can also be used as two independent logic functions, each of up to (K−1) inputs. Because this will require more than K logic signals, extra inputs must be provided to the LE. In the (K,M)-LUT, an extra M signals are included as inputs, so the LE has a total of K+M inputs. This allows it to implement two functions that have a total of K+M unique signals. For example, a (6,2)-LUT has a total of eight input signals and can implement a five-input function and a three-input function if all the signals are different. Alternatively, it can implement two different five-input functions, if two signals are identical, so that there are only eight unique signals required for the LE.

Figure 15:
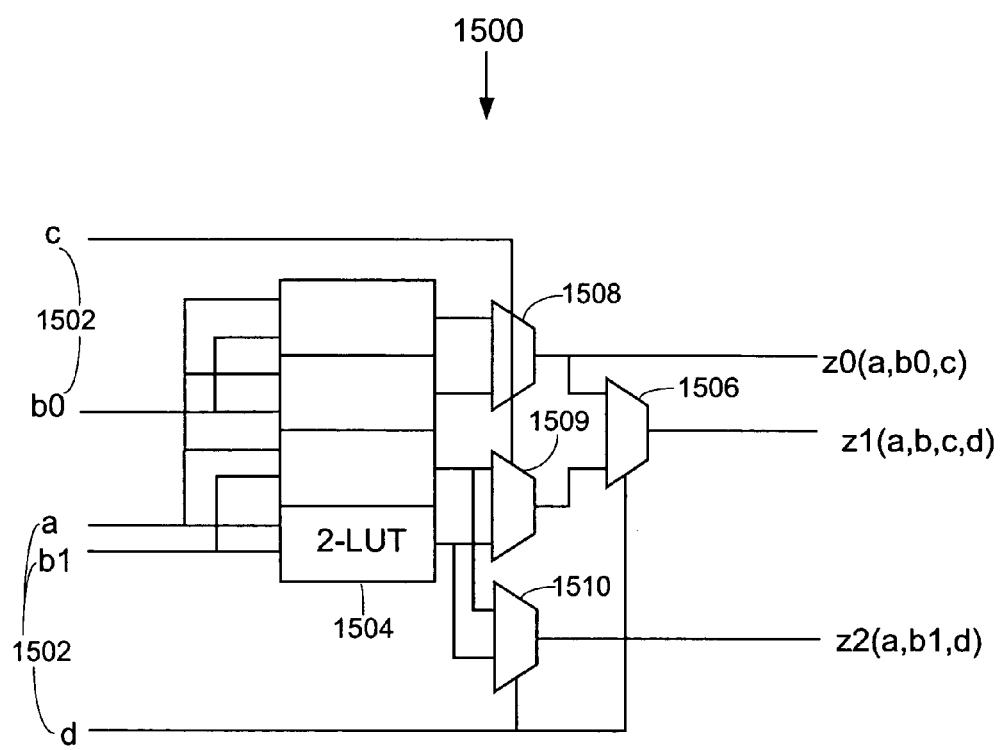
FIG. 15 shows a fracturable (4,1)-LUT.

In the case of M>0, it is necessary to split the LUT inputs to create extra inputs. This will be done by breaking one or more of the common lines to the two halves of the LUT into two separate signals. FIG. 15 shows a fracturable (4,1)-LUT 1500 that is similar in structure to the fracturable 4-LUT 300 shown in FIG. 3. Similarly as in FIG. 3, the fracturable LUT 1500 includes four 2-LUTs 1504, three internal multiplexers 1508, 1509, 1510, and an output multiplexer 1506. However, one of the controls 302 b in FIG. 3 has been connected to two controls (i.e., separate controls) b0 and b1 where the corresponding inputs to the four 2-LUTs 1504 have been split in half, so that the fracturable LUT 1500 has five controls 1502. Then in a conventional (un-fractured) mode of operation with b=b0=b1 the output multiplexer provides a logic function z1(a,b,c,d), and in a fractured mode of operation the first internal multiplexer 1508 provides a logic function z0(a,b0,c) and the third internal multiplexer 1510 provides a logic function z2(a,b1,d).

The embodiments described above with respect to FIGS. 1, and 5–14 can be adapted to include fracturable (K,M)-LUTs so as to increase the number of inputs available in fractured modes of operation. For illustrative purposes, embodiments related to FIGS. 1, 13 and 14 are presented below.

Figure 16:
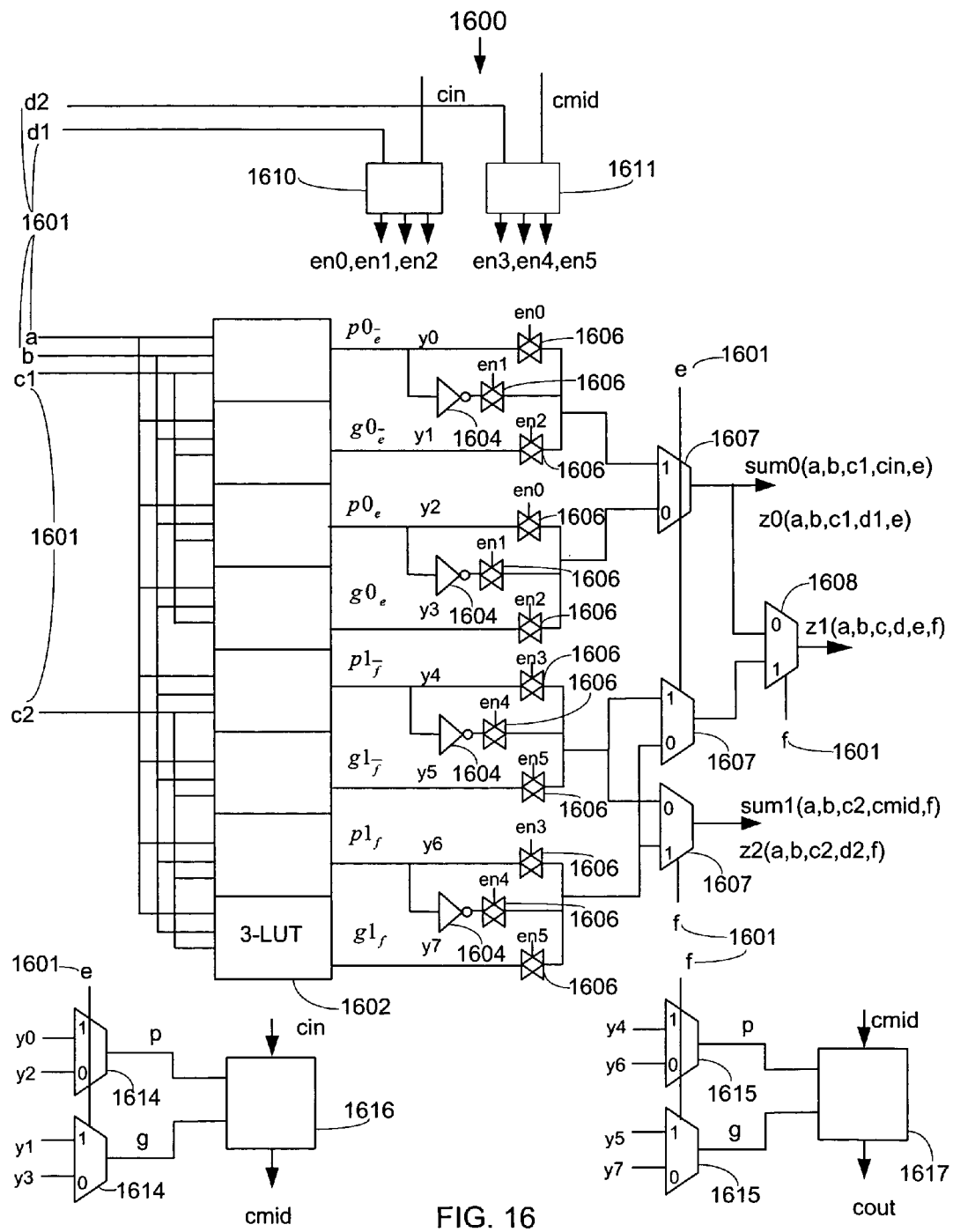
FIG. 16 shows an embodiment that includes a fracturable (6,2)-LUT adapted according to the embodiment shown in FIG. 1.

FIG. 16 shows a logic element 1600 according to an embodiment that incorporates structures of a fracturable (6,2)-LUT with aspects of the embodiment shown in FIG. 1. This embodiment can be understood by first splitting a 6-LUT into two halves and then applying the approach of FIG. 1 to each half (i.e., a 5-LUT), and then splitting two of the controls so as to enhance the functionality of the logic element 1600.

Analogously to the logic element 100 of FIG. 1, the logic element 1600 includes eight controls 1601 denoted as a, b, c1, c2, d1, d2, e, and f, where the c control has been connected to c1 and c2 and the d control has been connected to d1 and d2. Eight 3-LUTs 1602 are connected to four inverters 1604 and twelve pass gates 1606. The eight 3-LUTs 102 provide eight output values, y0, y1, y2, y3, y4, y5, y6, and y7, and the twelve pass gates 1606 are arranged to provide four output values. Three internal multiplexers 1607 are connected to the pass gates 1606 and an output multiplexer 1608 is connected to the internal multiplexers 1607.

The pass gates 1606 are controlled by pass gate controls en0, en1, en2, en3, en4, and en5 in an arrangement that duplicates the structures in FIG. 1 so that there are two pass-gate control elements 1610, 1611, both of which follow the logic table 112 of FIG. 1. Similarly there are two carry-chain elements 1616, 1617 with associated multiplexers 1614, 1615 connected to the 3-LUTs 1602. In addition to the carry-chain input cin and the carry-chain output cout, this embodiment includes a carry-chain middle value cmid that connects the two carry-chain elements 1616, 1617.

For the arithmetic mode, two carry-chain elements 1616, 1617 are cascaded. Two multiplexers 1614 are connected to y0, y1, y2, and y3, from the output values of the 3-LUTs 1602. A first carry chain element 1616 is connected to the multiplexers 1614 as well as cin, as a carry-chain input, and cmid, as a carry-chain output. Similarly two multiplexers 1615 are connected to y4, y5, y6, and y7, also from the output values of the 3-LUTs 1602. A second carry chain element 1617 is connected to the multiplexers 1615 as well as cmid, as a carry-chain input, and cout, as a carry-chain output.

In a conventional logic mode of operation with c=c1=c2 and d=d1=d2, the output multiplexer 1608 produces z1(a, b,c,d,e,f), a logical function of the six control inputs a, b, c, d, e, f.

In a second logic mode of operation, the first intermediate multiplexer 1607 produces z0(a,b,c1,d1,e) and the third intermediate multiplexer 1607 produces z2(a,b,c2,d2,e), each of which is a logical function of its arguments.

In an arithmetic mode of operation, the first intermediate multiplexer 1607 produces sum0(a, b, c1, cin, e)=f0(a, b, c1, e)⊕f1(a, b, c1,e)
⊕cin, an arithmetic sum of two logical functions of the control inputs a, b, c1, and e, where cin is the carry-chain input and cmid is the corresponding carry-chain output. The third intermediate multiplexer 1607 produces sum1(a, b, c2, cmid, f)=f2(a, b, c2, f)⊕f3(a, b, c2,
f)⊕cmid, an arithmetic sum of two logical functions of the control inputs a, b, c2, and f, where cmid is the carry-chain input and cout is the corresponding carry-chain output.

Figure 17:
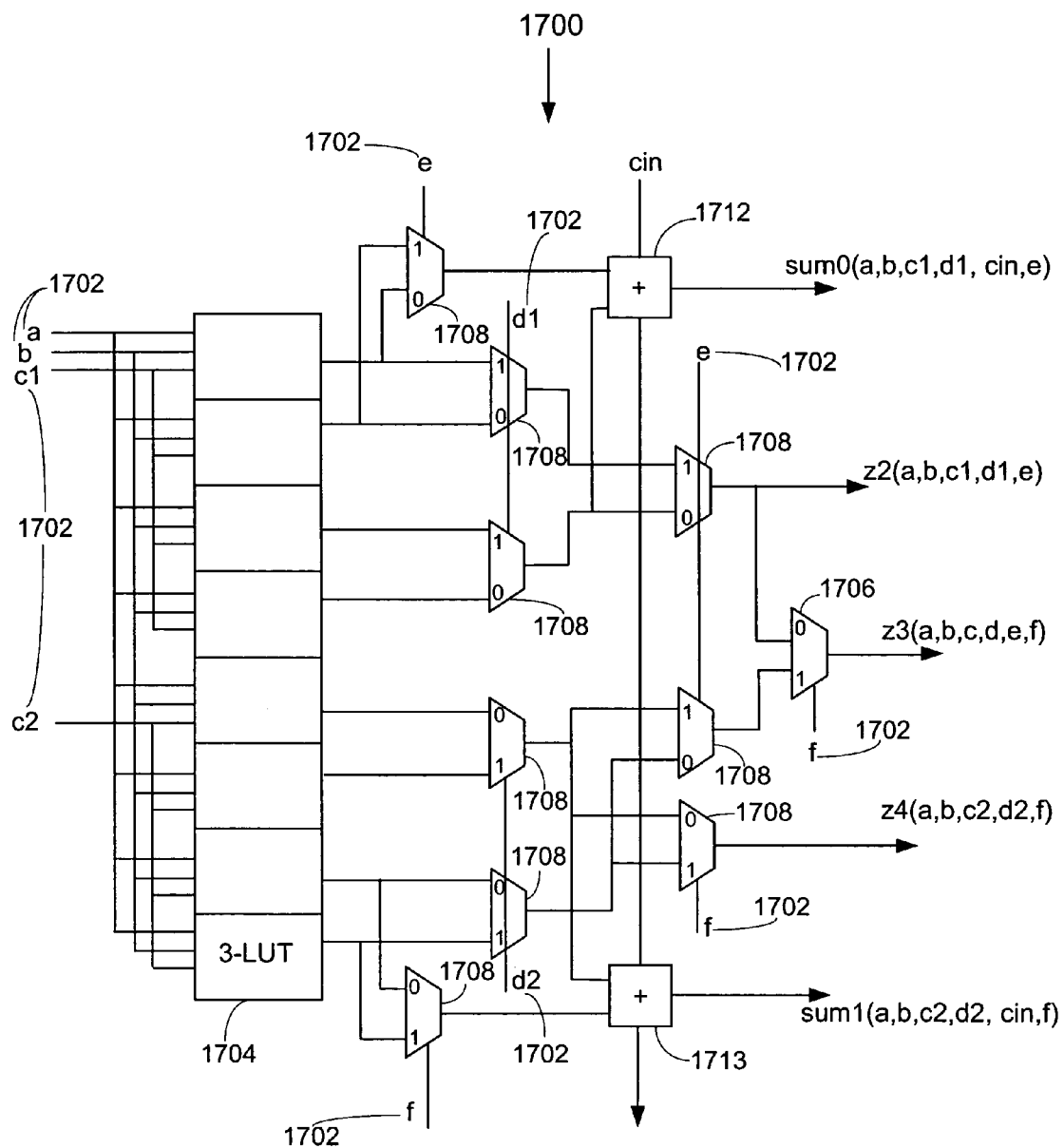
FIG. 17 shows an embodiment that includes a fracturable (6,2)-LUT adapted according to the embodiment shown in FIG. 13.

FIG. 17 shows a logic element 1700 according to an embodiment that incorporates structures of a fracturable (6,2)-LUT with aspects of the embodiment shown in FIG. 13. This embodiment can be understood by first splitting a 6-LUT into two halves and then applying the approach of FIG. 13 to each half (i.e., a 5-LUT), and then splitting two of the controls so as to enhance the functionality of the logic element 1700.

Analogously to the logic element 1300 of FIG. 13, the logic element 1700 includes eight controls 1702 denoted as a, b, c1, c2, d1, d2, e, and f, where the c control has been connected to c1 and c2 and the d control has been connected to d1 and d2. Eight 3-LUTs 1702 are connected to an output multiplexer 1706, and nine internal multiplexers 1708. Two dedicated adders 1712, 1713 are connected to the internal multiplexers 1708, to a carry-chain input cin, and to a carry-chain output cout and are additionally to each other through a carry-chain middle value cmid.

In a conventional logic mode of operation with c=c1=c2 and d=d1=d2, the output multiplexer 1706 produces z1(a, b,c,d,e,f), a logical function of the six control inputs a, b, c, d, e, f.

In a second logic mode of operation, a first intermediate multiplexer 1708 produces z2(a,b,c1,d1,e) and a second intermediate multiplexer 1708 produces z4(a,b,c2,d2,f), each of which is a logical function of its arguments.

In an arithmetic mode of operation, the first dedicated adder 1707 produces sum0(a,b, c1, d1, cin, e)=z0(a, b, c1, d1)⊕z1(a, b,
c1, e)⊕cin, an arithmetic sum of two logical functions, where cin is the carry-chain input and cmid is the corresponding carry-chain output. The second dedicated adder 1713 produces sum1(a,b,c2,d2,cin,f)=z5(a,b, c2, d2)⊕z6(a, b, c2,
f)⊕cmid, an arithmetic sum of two logical functions, where cmid is the carry-chain input and cout is the corresponding carry-chain output.

Figure 18:
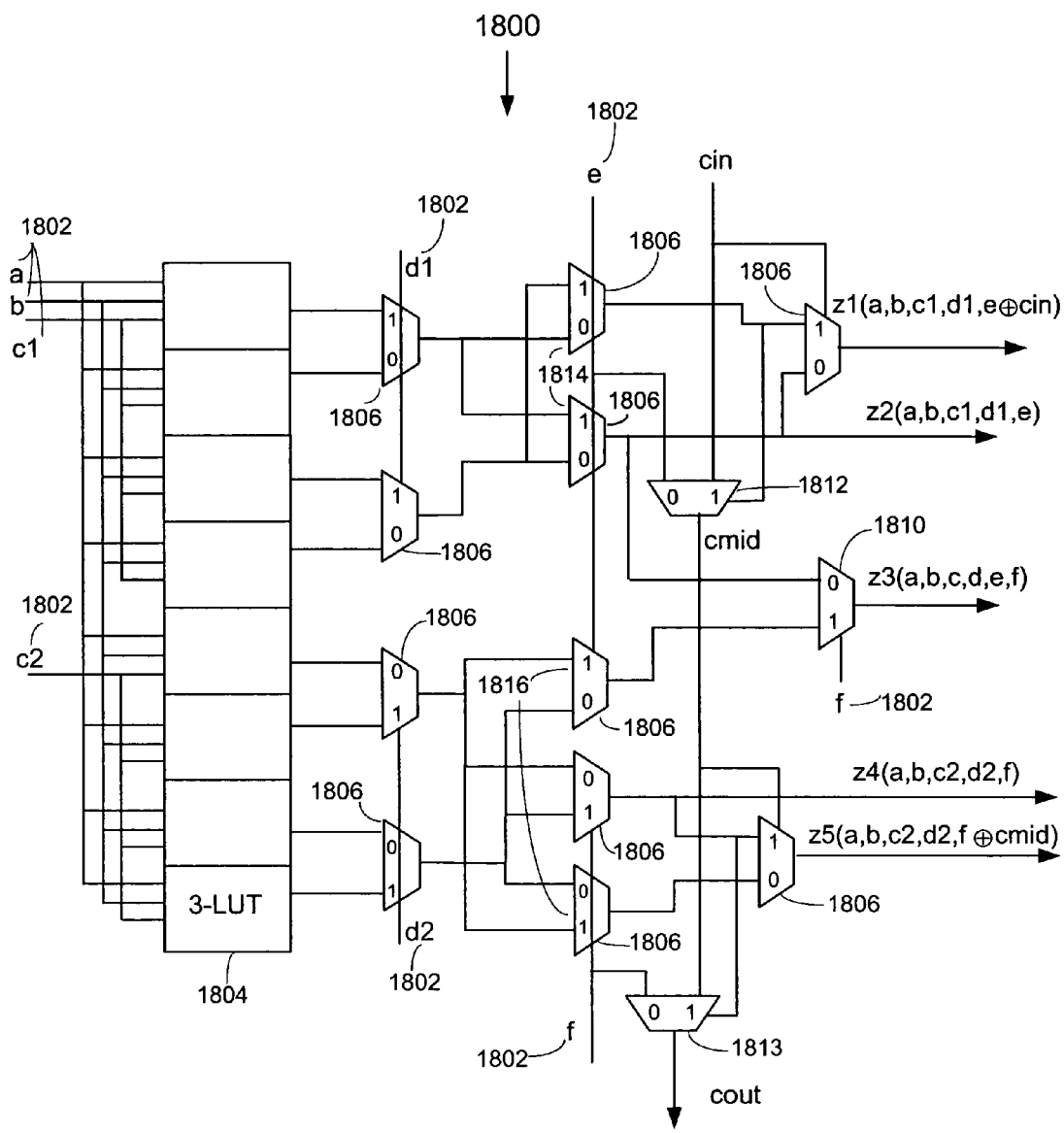
FIG. 18 shows an embodiment that includes a fracturable (6,2)-LUT adapted according to the embodiment shown in FIG. 14.

FIG. 18 shows a logic element 1800 according to an embodiment that incorporates structures of a fracturable (6,2)-LUT with aspects of the embodiment shown in FIG. 14. This embodiment can be understood by first splitting a 6-LUT into two halves and then applying the approach of FIG. 14 to each half (i.e., a 5-LUT), and then splitting two of the controls so as to enhance the functionality of the logic element 1800.

Analogously to the logic element 1400 of FIG. 14, the logic element 1800 includes eight controls 1802 denoted as a, b, c1, c2, d1, d2, e, and f, where the c control has been connected to c1 and c2 and the d control has been connected to d1 and d2. Eight 3-LUTs 1802 are connected to an output multiplexer 1810, and eleven internal multiplexers 1806, two pairs of which 1814,1816 have complementary (or switched) connections. Two carry-out select multiplexers 1812, 1813 are connected to the internal multiplexers 1806, to a carry-chain input cin, and to a carry-chain output cout and are additionally to each other through a carry-chain middle value cmid.

In a conventional logic mode of operation with c=c1=c2 and d=d1=d2, the output multiplexer 1810 produces z3(a, b,c,d,e,f), a logical function of the six control inputs a, b, c, d, e, f.

In a second logic mode of operation, an intermediate multiplexer 1806 produces z2(a,b,c1,d1,e) and another intermediate multiplexer 1806 produces z4(a,b,c2,d2,f), each of which is a logical function of its arguments.

In an arithmetic mode of operation, another intermediate multiplexer 1806 produces z1(a,b,c1,d1,e⊕cin), an arithmetic function where cin is the carry-chain input and cmid is the corresponding carry-chain output. In this case the first pair 1814 of intermediate multiplexers operate as complementary multiplexers. Another intermediate multiplexer 1806 produces z5(a,b,c2,d2,f⊕cmid), an arithmetic function where cmid is the carry-chain input and cout is the corresponding carry-chain output. In this case the second pair 1816 of intermediate multiplexers operate as complementary multiplexers.

ADDITIONAL EMBODIMENTS

Figure 19:
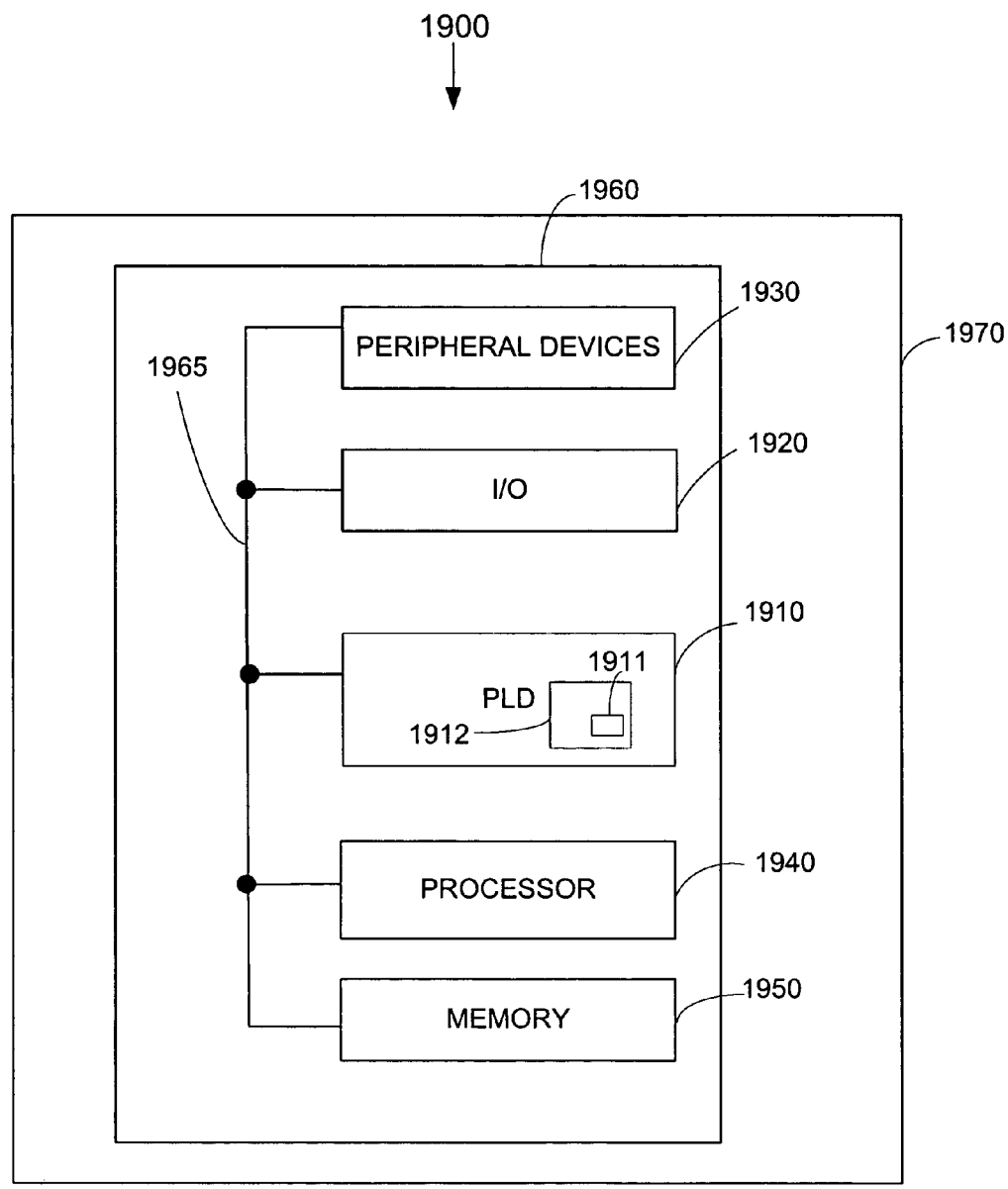
FIG. 19 shows an exemplary data processing system including an exemplary programmable logic device in which logic circuits in accordance with the present invention might be implemented.

The embodiments shown above are applicable generally to data processing environments. For example, FIG. 19 shows a data processing system 1900 with a PLD 1910 that may include embodiments of the present invention as discussed above. The PLD 1910 includes a plurality of logic array blocks (LABs) such as the illustrated LAB 1912. (Only one LAB is shown to avoid overcomplicating the drawing.) The LAB 1912 includes a plurality of logic elements such as the illustrated logic element 1911. (Only one logic element is shown to avoid overcomplicating the drawing.) The data processing system 1900 may include one or more of the following components: a processor 1940; memory 1950; I/O circuitry 1920; and peripheral devices 1930. These components are coupled together by a system bus 1965 and are populated on a circuit board 1960 which is contained in an end-user system 1970.

The system 1900 can be used in a wide variety of applications, such as computer networking, data networking, instrumentation, video processing, digital signal processing, or any other application where the advantage of using programmable or reprogrammable logic is desirable. The PLD 1910 can be used to perform a variety of different logic functions. For example, the PLD 1910 can be configured as a processor or controller that works in cooperation with processor 1940 (or, in alternative embodiments, a PLD might itself act as the sole system processor). The PLD 1910 may also be used as an arbiter for arbitrating access to shared resources in the system 1900. In yet another example, the PLD 1910 can be configured as an interface between the processor 1940 and one of the other components in system 1900. It should be noted that system 1900 is only exemplary.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A logic element, comprising:
a plurality of LUTs (look-up tables);
a plurality of inverters connected to the LUTs;
a plurality of pass gates connected to the LUTs and the inverters;
an output multiplexer connected to the pass gates;
a carry-chain input;
a carry-chain unit connected to the LUTs and the carry-chain input; and
a plurality of controls connected to the LUTs, the pass gates, the output multiplexer, and the carry-chain unit, wherein
in a logic mode the output multiplexer provides a logic function of the controls, and
in an arithmetic mode the output multiplexer provides an arithmetic sum of two logic functions of the controls where the carry-chain unit provides a corresponding carry-chain output.

2. A logic element as claimed in claim 1, wherein
the LUTs include a first LUT, a second LUT, a third LUT, and a fourth LUT,
the inverters include a first inverter that receives input from the first LUT, and a second inverter that receives input from the third LUT, and
the pass gates include a first pass gate that receives input from the first LUT, a second pass gate that receives input from the first inverter, a third pass gate that receives input from the second LUT, a fourth pass gate that receives input from the third LUT, a fifth pass gate that receives input from the second inverter, and a sixth pass gate that receives input from the fourth LUT.

3. A logic element as claimed in claim 1, wherein in the logic mode, the output multiplexer provides a complete function of the controls.

4. A logic element as claimed in claim 1, wherein in the arithmetic mode, the output multiplexer provides an arithmetic sum of two complete functions of a proper subset of the controls.

5. A logic element as claimed in claim 1, wherein at least one control is connected to a plurality of separate controls.

6. A programmable logic device, comprising:
a logic element as claimed in claim 1.

7. A data processing system, comprising:
a programmable logic device as claimed in claim 6.

8. A logic element, comprising:
a plurality of LUTs;
a plurality of data multiplexers connected to the LUTs, the data multiplexers including an output multiplexer;
a plurality of controls connected to the data multiplexers and the LUTs, the controls including an additive control, so that the LUTs, the data multiplexers and the controls define a fracturable LUT having a plurality of fractured outputs, including a first fractured output and a second fractured output;
a carry-chain input; and
a carry-out select multiplexer connected to the carry-chain input, the first fractured output and the second fractured output;
an XOR unit connected to the carry-chain input and the second fractured output, wherein
in a logic mode the output multiplexer provides a first logic function of the controls, and
in an arithmetic mode the XOR unit provides an arithmetic sum of the additive control and a second logic function of the controls where the carry-out select multiplexer provides a corresponding carry-chain output.

9. A logic element as claimed in claim 8, wherein
the multiplexers include an additional output multiplexer, and
in the arithmetic mode the additional output multiplexer provides an additional logic function of the controls.

10. A logic element as claimed in claim 8, wherein in the logic mode, the first logic function provides a complete function of the controls.

11. A logic element as claimed in claim 8, wherein in the arithmetic mode, the second logic function provides a complete logic function of a proper subset of the controls.

12. A logic element as claimed in claim 8, wherein at least one control is connected to a plurality of separate controls.

13. A programmable logic device, comprising:
a logic element as claimed in claim 8.

14. A data processing system, comprising:
a programmable logic device as claimed in claim 13.

15. A logic element, comprising:
a plurality of LUTs;
a plurality of data multiplexers connected to the data multiplexers and the LUTs, the data multiplexers including an output multiplexer;
a plurality of controls connected to the data multiplexers and the LUTs, the controls including an additive control, so that the LUTs, the data multiplexers and the controls define a fracturable LUT having at least one fractured output, including a first fractured output;
a carry-chain input;
a carry-out select multiplexer connected to the carry-chain input, the first fractured output and the additive control; and
an XOR unit connected to the carry-chain input and the first fractured output, wherein
in a logic mode the output multiplexer provides a first logic function of the controls, and
in an arithmetic mode the XOR unit provides an arithmetic sum of the additive control and a second logic function of the controls where the carry-out select multiplexer provides a corresponding carry-chain output.

16. A logic element as claimed in claim 15, wherein
the multiplexers include an additional output multiplexer, and
in the arithmetic mode the additional output multiplexer provides an additional logic function of the controls.

17. A logic element as claimed in claim 15, wherein in the logic mode, the first logic function provides a complete function of the controls.

18. A logic element as claimed in claim 15, wherein in the arithmetic mode, the second logic function provides a complete logic function of a proper subset of the controls.

19. A logic element as claimed in claim 15, wherein at least one control is connected to a plurality of separate controls.

20. A programmable logic device, comprising:
a logic element as claimed in claim 15.

21. A data processing system, comprising:
a programmable logic device as claimed in claim 20.

22. A logic element, comprising:
a plurality of LUTs;
a plurality of data multiplexers connected to the data multiplexers and the LUTs, the data multiplexers including an output multiplexer;
a plurality of controls connected to the data multiplexers and the LUTs, the controls including an additive control, so that the LUTs, the data multiplexers and the controls define a fracturable LUT having at least one fractured output, including a first fractured output;
a carry-chain input;
a carry-out select multiplexer connected to the carry-chain input, the first fractured output and the output multiplexer; and
an XOR unit connected to the carry-chain input and the output mulitplexer, wherein
in a logic mode the output multiplexer provides a first logic function of the controls, and
in an arithmetic mode the XOR unit provides an arithmetic sum of the additive control and a second logic function of the controls where the carry-out select multiplexer provides a corresponding carry-chain output.

23. A logic element as claimed in claim 22, wherein in the arithmetic mode, the output multiplexer receives two complementary inputs.

24. A logic element as claimed in claim 22 wherein in the arithmetic mode, the second logic function provides a complete logic function of a proper subset of the controls.

25. A logic element as claimed in claim 22, wherein in the logic mode, the first logic function provides a complete function of the controls.

26. A logic element as claimed in claim 22, wherein at least one control is connected to a plurality of separate controls.

27. A programmable logic device, comprising:
a logic element as claimed in claim 22.

28. A data processing system, comprising:
a programmable logic device as claimed in claim 27.

29. A logic element, comprising:
a plurality of LUTs;
a plurality of data multiplexers connected to the LUTs, the data multiplexers including an output multiplexer;
a plurality of controls connected to the data multiplexers and the LUTs, the controls including an additive control, so that the LUTs, the data multiplexers and the controls define a fracturable LUT having a plurality of fractured outputs, including a first fractured output and a second fractured output;
a carry-chain input;
a carry-out select multiplexer connected to the carry-chain input and the additive control;
an internal XOR unit connected to the second fractured output, the additive control, and the carry-out select multiplexer; and
an output XOR unit connected to the carry-chain input and the internal XOR unit, wherein
in a logic mode the output multiplexer provides a first logic function of the controls, and
in an arithmetic mode the second fractured output provides a second logic function of the controls, the first fractured output provides a third logic function of the controls, and the output XOR unit provides an arithmetic sum of the additive control and the second logic function of the controls where the carry-out select multiplexer provides a corresponding carry-chain output.

30. A logic element as claimed in claim 29, wherein the internal XOR unit controls the carry-out select multiplexer.

31. A logic element as claimed in claim 29, wherein in the logic mode, the first logic function provides a complete function of the controls.

32. A logic element as claimed in claim 29, wherein in the arithmetic mode, the second logic function and the third logic function each provide a complete logic function of a proper subset of the controls.

33. A logic element as claimed in claim 29, wherein at least one control is connected to a plurality of separate controls.

34. A programmable logic device, comprising:
a logic element as claimed in claim 29.

35. A data processing system, comprising:
a programmable logic device as claimed in claim 34.

36. A logic element, comprising:
a plurality of LUTs;
a plurality of data multiplexers connected to the LUTs, the data multiplexers including an output multiplexer;
a plurality of controls connected to the data multiplexers and the LUTs, the controls including an additive control, so that the LUTs, the data multiplexers and the controls define a fracturable LUT having a plurality of fractured outputs, including a first fractured output and a second fractured output;
a carry-chain input;
a carry-out select multiplexer connected to the carry-chain input and the second fractured output;
an internal XOR unit connected to the second fractured output, the additive control, and the carry-out select multiplexer; and
an output XOR unit connected to the carry-chain input and the internal XOR unit,
wherein
in a logic mode the output multiplexer provides a first logic function of the controls, and
in an arithmetic mode the second fractured output provides a second logic function of the controls, the first fractured output provides a third logic function of the controls, and the output XOR unit provides an arithmetic sum of the additive control and the second logic function of the controls where the carry-out select multiplexer provides a corresponding carry-chain output.

37. A logic element as claimed in claim 36, wherein the internal XOR unit controls the carry-out select multiplexer.

38. A logic element as claimed in claim 36, wherein in the logic mode, the first logic function provides a complete function of the controls.

39. A logic element as claimed in claim 36, wherein in the arithmetic mode, the second logic function and the third logic function each provide a complete logic function of a proper subset of the controls.

40. A logic element as claimed in claim 36, wherein at least one control is connected to a plurality of separate controls.

41. A programmable logic device, comprising:
a logic element as claimed in claim 36.

42. A data processing system, comprising:
a programmable logic device as claimed in claim 41.

43. A logic element, comprising:
a plurality of LUTs;
a plurality of data multiplexers connected to the LUTs, the data multiplexers including an output multiplexer;
a plurality of controls connected to the data multiplexers and the LUTs, so that the LUTs, the data multiplexers and the controls define a fracturable LUT having a plurality of fractured outputs, including a first fractured output, a second fractured output, and a third fractured output;
a carry-chain input; and
an adder unit connected to the first fractured output and the second fractured output and the carry-chain input, wherein
in a logic mode the output multiplexer provides a first logic function of the controls, and
in an arithmetic mode the first fractured output provides a second logic function of the controls, the third fractured output provides a third logic function of the controls, and the adder unit provides an arithmetic sum of the second logic function of the controls and the third logic function of the controls where the adder unit provides a corresponding carry-chain output.

44. A logic element as claimed in claim 43, wherein the adder unit includes a plurality of XOR units.

45. A logic element as claimed in claim 43, wherein in the logic mode, the first logic function provides a complete function of the controls.

46. A logic element as claimed in claim 43, wherein in the arithmetic mode, the second logic function and the third logic function each provide a complete logic function of a proper subset of the controls.

47. A logic element as claimed in claim 43, wherein at least one control is connected to a plurality of separate controls.

48. A programmable logic device, comprising:
a logic element as claimed in claim 43.

49. A data processing system, comprising:
a programmable logic device as claimed in claim 48.

50. A logic element, comprising:
a plurality of LUTs;
a plurality of data multiplexers connected to the LUTs, the data multiplexers including an output multiplexer, a first complementary multiplexer, and a second complementary multiplexer, so that the first complementary multiplexer and the second complementary multiplexer have complementary connections to the LUTs;
a plurality of controls connected to the data multiplexers and the LUTs, the controls including an additive control;
a carry-chain input connected to the output multiplexer; and
a carry-out select multiplexer connected to the carry-chain input, the additive control and the data multiplexers, wherein
in a logic mode the first complementary multiplexer provides a logic function of the controls, and
in an arithmetic mode the output multiplexer provides an arithmetic modification of the logic function of the controls where the additive control is replaced by an arithmetic sum and the carry-out select multiplexer provides a corresponding carry-chain output.

51. A logic element as claimed in claim 50, wherein the arithmetic sum includes the additive control.

52. A logic element as claimed in claim 50, wherein the second complementary multiplexer provides a value of the logic function that is complementary with respect to the additive control.

53. A logic element as claimed in claim 50, wherein the logic function provides a complete function of the controls.

54. A logic element as claimed in claim 50, wherein at least one control is connected to a plurality of separate controls.

55. A programmable logic device, comprising:
a logic element as claimed in claim 50.

56. A data processing system, comprising:
a programmable logic device as claimed in claim 55.

* * * * *